(12) United States Patent
Ueno et al.

(10) Patent No.: US 6,799,420 B2
(45) Date of Patent: Oct. 5, 2004

(54) METHOD OF EVALUATING DETERIORATED STATE OF HYDROCARBON ADSORBENT

(75) Inventors: Masaki Ueno, Wako (JP); Tetsuo Endo, Wako (JP); Hideharu Yamazaki, Wako (JP); Shiro Takakura, Wako (JP); Kei Machida, Wako (JP); Yasuyuki Miyahara, Wako (JP); Tadashi Sato, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/268,975

(22) Filed: Oct. 11, 2002

(65) Prior Publication Data

US 2003/0089100 A1 May 15, 2003

(30) Foreign Application Priority Data

| Oct. 12, 2001 | (JP) | ............ | 2001-315928 |
| Dec. 27, 2001 | (JP) | ............ | 2001-395946 |
| Jul. 29, 2002 | (JP) | ............ | 2002-219718 |

(51) Int. Cl.$^7$ ................................ F01N 3/00
(52) U.S. Cl. ................. 60/277; 60/274; 60/276; 60/297
(58) Field of Search ............. 60/274, 276, 277, 60/297, 288, 311; 73/23.31, 23.32, 118.1

(56) References Cited

U.S. PATENT DOCUMENTS

| 6,422,006 B2 | * | 7/2002 | Ohmori et al. | ............ | 60/297 |
| 6,477,830 B2 | * | 11/2002 | Takakura et al. | ............ | 60/277 |
| 6,581,370 B2 | * | 6/2003 | Sata et al. | ............ | 60/277 |
| 2001/0025484 A1 | * | 10/2001 | Ueno et al. | ............ | 60/277 |

FOREIGN PATENT DOCUMENTS

| EP | 1 132 589 A1 | 9/2001 |
| JP | 5-256124 | * 10/1993 |
| JP | 10-159543 | 6/1998 |

OTHER PUBLICATIONS

Search report.

* cited by examiner

Primary Examiner—Tu M. Nguyen
(74) Attorney, Agent, or Firm—Armstrong, Kratz, Quintos, Hanson & Brooks, LLP

(57) ABSTRACT

A temperature sensor is disposed near an HC adsorbent in an exhaust system of an internal combustion engine. After the internal combustion engine is shut off, a deteriorated state of the HC adsorbent is evaluated based on a value of the humidity detected by a humidity sensor. The deteriorated state of the HC adsorbent is evaluated by comparing the detected value of the humidity with a threshold established depending on the temperature state near the HC adsorbent. In evaluating deteriorated state of the HC adsorbent, a change in the output characteristics of the humidity sensor depending on its temperature state is compensated for.

21 Claims, 18 Drawing Sheets

METHOD OF EVALUATING DETERIORATED STATE OF HYDROCARBON ADSORBENT

BACKGROUND OF THE INVENTION

1. Field of the Invention

The present invention relates to a method of evaluating a deteriorated state of a hydrocarbon adsorbent which is disposed in the exhaust passage of an internal combustion engine for adsorbing hydrocarbons in an exhaust gas emitted from the internal combustion engine.

2. Description of the Related Art

Some known systems for purifying exhaust gases emitted from internal combustion engines have an exhaust gas purifier disposed in the exhaust passage, which may comprise a hydrocarbon adsorbent such as zeolite or a hydrocarbon adsorbing catalyst comprising a composite combination of a hydrocarbon adsorbent and a three-way catalyst, for adsorbing hydrocarbons (HC) in the exhaust gas while the catalytic converter such as a three-way catalyst or the like is not functioning sufficiently, i.e., while the catalytic converter is not sufficiently high in temperature and not activated, such as when the internal combustion engine starts to operate at a low temperature. The hydrocarbon adsorbent functions to adsorb hydrocarbons in the exhaust gas at relatively low temperatures below 100° C., for example, and operates to release the adsorbed hydrocarbons when heated to a certain temperature in the range from 100 to 250° C., for example.

One conventional technique for evaluating a deteriorated state of such a hydrocarbon adsorbent is disclosed in Japanese laid-open patent publication No. 10-159543, for example. According to the disclosed technique, temperature sensors are positioned respectively upstream and downstream of an exhaust gas purifier which has the hydrocarbon adsorbent. On the assumption that the hydrocarbon adsorbent is not deteriorated but brand-new, the temperature downstream of the exhaust gas purifier is estimated from the temperature detected by the temperature sensor that is positioned upstream of the exhaust gas purifier. A deteriorated state of the hydrocarbon adsorbent is then evaluated on the basis of the difference between the estimated temperature and the temperature detected by the temperature sensor that is positioned downstream of the exhaust gas purifier.

However, it is difficult for the above conventional evaluating system to evaluate a deteriorated state of the hydrocarbon adsorbent with accuracy because the temperatures detected by the respective temperature sensors positioned upstream and downstream of the exhaust gas purifier are susceptible to various factors including the ambient temperature, etc. The conventional evaluating system is disadvantageous as to its cost because it requires two temperature sensors positioned respectively upstream and downstream of the exhaust gas purifier.

According to another known technique, a hydrocarbon sensor (HC sensor) is positioned downstream of a hydrocarbon adsorbent, and an adsorbed state of HC adsorbed by the hydrocarbon adsorbent, e.g., an adsorbed amount of HC, is directly recognized on the basis of a detected output signal from the HC sensor, so that a deteriorated state of the hydrocarbon adsorbent can be evaluated from the recognized adsorbed state of HC.

Generally, however, an HC sensor reacts with not all kinds of hydrocarbons that can be adsorbed by a hydrocarbon adsorbent. Consequently, the adsorbed state of HC adsorbed by the hydrocarbon adsorbent, as recognized by the HC sensor, may not sufficiently represent the actually adsorbed state of HC adsorbed by the hydrocarbon adsorbent. Accordingly, it often is difficult to accurately evaluate a deteriorated state of the hydrocarbon adsorbent. In addition, the HC sensor poses a cost problem as it is relatively expensive.

SUMMARY OF THE INVENTION

It is therefore an object of the present invention to provide a method of accurately evaluating, with a relatively inexpensive arrangement, a deteriorated state of a hydrocarbon adsorbent disposed in the exhaust passage of an internal combustion engine.

According to the findings of the inventor of the present invention, a hydrocarbon adsorbent disposed in the exhaust passage of an internal combustion engine is capable of adsorbing not only hydrocarbons contained in the exhaust gas emitted from the internal combustion engine, but also moisture in the exhaust gas. The ability of the hydrocarbon adsorbent to adsorb moisture is highly related to its ability to adsorb hydrocarbons (a maximum amount of hydrocarbons that can be adsorbed). The ability to adsorb moisture and the ability to adsorb hydrocarbons drop in the same manner as each other when the hydrocarbon adsorbent is progressively deteriorated. Therefore, the ability to adsorb hydrocarbons can be evaluated by evaluating the ability of the hydrocarbon adsorbent to adsorb moisture.

As described in detail later on, the findings of the inventors of the present invention indicate that the humidity (relative humidity) in the exhaust passage near the hydrocarbon adsorbent changes after the internal combustion engine is shut off, as follows: When the internal combustion engine is shut off after it has been normally operated continuously for a certain period of time, the humidity (relative humidity) near the hydrocarbon adsorbent increases, as indicated by the left end portions of curves shown in an upper section of FIG. 4 of the accompanying drawings, immediately after the internal combustion engine is shut off (generally for a period of time of several tens minutes from the termination of the operation of the internal combustion engine) because the saturated water vapor pressure drops due to a temperature reduction caused by the radiation of heat from the hydrocarbon adsorbent. After the temperature of the hydrocarbon adsorbent falls to a temperature capable of adsorbing moisture, the hydrocarbon adsorbent starts adsorbing moisture in the exhaust gas that remains around the hydrocarbon adsorbent. Therefore, the humidity (relative humidity) of the exhaust gas near (around) the hydrocarbon adsorbent increases to a maximum value and thereafter decreases. The humidity increases and decreases near the hydrocarbon adsorbent, i.e., the humidity increases before the maximum value and decreases after the maximum value, not instantaneously, but within a period of time ranging from several tens minutes to several hours. When the hydrocarbon adsorbent continuously adsorbs moisture until it is saturated, the humidity near (around) the hydrocarbon adsorbent becomes substantially constant, or more specifically, its time-dependent changes are extremely small.

As the hydrocarbon adsorbent further deteriorates, it is harder for the hydrocarbon adsorbent to adsorb moisture. Therefore, as the hydrocarbon adsorbent further deteriorates, the hydrocarbon adsorbent adsorbs moisture at a lower rate after its temperature has dropped to a temperature capable of adsorbing moisture. As a result, the maximum value or an increase in the humidity from the time when the internal combustion engine is shut off to the maximum value becomes larger. Furthermore, as the hydrocarbon adsorbent further deteriorates, the amount of moisture absorbed by the hydrocarbon adsorbent until it is saturated becomes smaller. Therefore, when the humidity near the hydrocarbon adsorbent is substantially constant, the humidity is basically higher as the hydrocarbon adsorbent is deteriorated more. Finally, because a gas exchange progresses between the exhaust passage and its exterior (generally, the gas exchange progresses very slowly), the humidity in the exhaust passage is converged to a humidity equivalent to the humidity outside of the exhaust passage. Therefore, the humidity (relative humidity) in the exhaust passage near the hydrocarbon adsorbent after the internal combustion engine is shut off changes in a manner highly correlated to the deteriorated state of the hydrocarbon adsorbent within a period before the humidity is converted to a humidity equal to the humidity in the exhaust passage.

According to the present invention, a method of evaluating a deteriorated state of a hydrocarbon adsorbent which is disposed in an exhaust passage of an internal combustion engine for adsorbing hydrocarbons in an exhaust gas emitted from the internal combustion engine has been devised in view of the above phenomenon. The method comprises the step of, after the internal combustion engine is shut off, evaluating the deteriorated state of the hydrocarbon adsorbent based on an output signal from a humidity sensor which is disposed in the exhaust passage close to the hydrocarbon adsorbent for detecting a humidity in the exhaust passage, within a period of time before the humidity represented by the output signal from the humidity sensor is converged to a humidity outside of the exhaust passage.

In the above method, the output signal from the humidity sensor within the period of time before the humidity near the hydrocarbon adsorbent is converged to the humidity outside of the exhaust passage is used in evaluating the deteriorated state of the hydrocarbon adsorbent. The humidity near the hydrocarbon adsorbent after the internal combustion engine is shut off changes characteristically with respect to the deteriorated state of the hydrocarbon adsorbent as described above. Therefore, the deteriorated state of the hydrocarbon adsorbent can be evaluated based on the output signal from the humidity sensor within the above period of time. Because the internal combustion engine is shut off, the state of the exhaust gas within the exhaust passage including a region near the hydrocarbon adsorbent is unlikely to change instantaneously. Therefore, the output signal from the humidity sensor is stable and highly dependent on the deteriorated state of the hydrocarbon adsorbent. The humidity sensor is not required to be highly responsive insofar as it is capable of detecting a humidity which is unlikely to change instantaneously, i.e., which is highly stable. Therefore, the humidity sensor may be relatively inexpensive. According to the present invention, therefore, the deteriorated state of the hydrocarbon adsorbent can be evaluated highly accurately with a relatively inexpensive arrangement.

According to the present invention, because the humidity near the hydrocarbon adsorbent (the humidity detected by the humidity sensor) changes as described above after the internal combustion engine is shut off, an output signal acquired from the humidity sensor within a predetermined steady period in which the output signal from the humidity sensor is kept substantially constant may be used for evaluating the deteriorated state of the hydrocarbon adsorbent.

The output signal from the humidity sensor in the steady period corresponds to the humidity (detected humidity) near the hydrocarbon adsorbent in a state before the humidity near (around) the hydrocarbon adsorbent is converted to the humidity outside of the exhaust passage after the internal combustion engine is shut off, and also in a state where the humidity is substantially constant (such a state will hereafter be referred to occasionally as "steady humidity state"). The output signal from the humidity sensor in the steady period (the output signal is substantially constant in the steady period) depends on the deteriorated state of the hydrocarbon adsorbent, as described above. Since the hydrocarbon adsorbent and the state of the exhaust gas around the humidity sensor near the hydrocarbon adsorbent are substantially static (steady) in the steady period, the output signal from the humidity sensor in the steady period is highly stable and highly reliable as depending on the deteriorated state of the hydrocarbon adsorbent. The deteriorated state of the hydrocarbon adsorbent can thus be evaluated more accurately.

According to the present invention, the steady period comprises, for example, a period after elapse of a predetermined time at least after the internal combustion engine is shut off. Specifically, until the hydrocarbon adsorbent adsorbs moisture therearound and is saturated, i.e., until the steady moisture state is initiated, after the internal combustion engine is shut off, a certain period of time (two to four hours for the exhaust system of an automobile) is needed. According to the present invention, the deteriorated state of the hydrocarbon adsorbent is evaluated based on the output signal from the humidity sensor after elapse of the predetermined time. This allows the output signal from the humidity sensor, which is appropriate for evaluating the deteriorated state of the hydrocarbon adsorbent, to be obtained without the need for monitoring the output signal from the humidity sensor frequently.

According to the present invention, the steady period comprises a period after at least a temperature state close to the hydrocarbon adsorbent is substantially equal to a temperature state outside of the exhaust passage. Specifically, after the internal combustion engine is shut off, the temperature near the hydrocarbon adsorbent drops and is finally converged to a temperature substantially equal to the temperature outside of the exhaust passage. When the temperature state near the hydrocarbon adsorbent is substantially equal to the temperature state outside of the exhaust passage, since the saturated water vapor pressure near the hydrocarbon adsorbent is substantially constant, the humidity near the hydrocarbon adsorbent is also substantially constant. Accordingly, if the steady period comprises the period after the temperature state close to the hydrocarbon adsorbent is substantially equal to the temperature state outside of the exhaust passage, then it is possible to obtain the output signal of the humidity sensor which is appropriate for evaluating the deteriorated state of the hydrocarbon adsorbent.

According to the present invention, the steady period terminates when a predetermined time elapses after the internal combustion engine is shut off. Specifically, after the internal combustion engine is shut off, the humidity near the hydrocarbon adsorbent is finally converged to the humidity substantially equal to the humidity outside of the exhaust passage, as described above. Consequently, the steady period is selected to terminate when the predetermined time elapses after the internal combustion engine is shut off, and the deteriorated state of the hydrocarbon adsorbent is evaluated based on the output signal from the humidity sensor prior to the time when the predetermined time elapses. It is thus possible to obtain the output signal of the humidity sensor which is appropriate for evaluating the deteriorated state of the hydrocarbon adsorbent. The predetermined time referred to above is a time (24 to 72 hours for the exhaust system of an automobile) sufficiently longer than the time when the steady moisture state is initiated after the internal combustion engine is shut off.

According to the present invention in which the output signal from the humidity sensor that is acquired within the steady period is used for evaluating the deteriorated state of the hydrocarbon adsorbent, the deteriorated state of the hydrocarbon adsorbent should preferably be evaluated by comparing either the output signal of the humidity sensor acquired within the steady period or a humidity represented by the output signal with a threshold established depending on the temperature state of the hydrocarbon adsorbent when the output signal of the humidity sensor is acquired.

As described above, the humidity detected by the humidity sensor within the steady period (the humidity near the hydrocarbon adsorbent) is basically higher as the hydrocarbon adsorbent is deteriorated more. Therefore, it is possible to evaluate how the hydrocarbon adsorbent is deteriorated by comparing the output signal acquired from the humidity sensor within the steady period or a humidity represented by the output signal with a suitable threshold. However, the maximum amount of moisture that can be adsorbed by the hydrocarbon adsorbent, and the maximum amount of HC that can be adsorbed by the hydrocarbon adsorbent are affected by the temperature of the hydrocarbon adsorbent. Basically, the maximum amounts of moisture and HC that can be adsorbed by the hydrocarbon adsorbent are greater as the temperature of the hydrocarbon adsorbent is lower. Therefore, the humidity near the hydrocarbon adsorbent in the steady period and the output signal from the humidity sensor are affected by not only the deteriorated state of the hydrocarbon adsorbent, but also the temperature state of the hydrocarbon adsorbent. By setting the threshold to be compared with the output signal from the humidity sensor within the steady period depending on the temperature state of the hydrocarbon adsorbent at the time the output signal from the humidity sensor is acquired, it is possible to evaluate more appropriately the deteriorated state of the hydrocarbon adsorbent based on the output signal from the humidity sensor.

While the temperature state of the hydrocarbon adsorbent which is required to establish the threshold may be directly recognized by a temperature sensor which detects the temperature of the hydrocarbon adsorbent itself, the temperature of the hydrocarbon adsorbent may be estimated from another parameter. Alternatively, temperature data correlated to the temperature state of the hydrocarbon adsorbent (e.g., a detected or estimated value of the engine temperature of the internal combustion engine or the temperature of the exhaust gas near the hydrocarbon adsorbent) may be used as a substitute representing the temperature state of the hydrocarbon adsorbent. The temperature state of the hydrocarbon adsorbent which is to be recognized to establish the threshold is not required to be strictly a temperature state at the same time as when the output signal from the humidity sensor is acquired, but may be a temperature state at any time near that time (or more specifically, any time within a time range in which the temperature state can be regarded as being equal to the temperature state of the hydrocarbon adsorbent at that time).

If the output signal from the humidity sensor within the steady period is used for evaluating the deteriorated state of the hydrocarbon adsorbent, then at least the output signal from the humidity sensor at any one time within the steady period may be used. However the deteriorated state of the hydrocarbon adsorbent may be evaluated using output signals acquired from the humidity sensor at a plurality of times within the steady period.

According to the present invention, the output signal from the humidity sensor which can be used for evaluating the deteriorated state of the hydrocarbon adsorbent is not limited to the output signal from the humidity sensor within the steady period. Specifically, before the humidity detected by the humidity sensor is converged to the humidity outside of the exhaust passage, the deteriorated state of the hydrocarbon adsorbent can be evaluated based on an output signal acquired from the humidity sensor upon elapse of a predetermined time after the internal combustion engine is shut off.

For example, after the internal combustion engine is shut off, the humidity near the hydrocarbon adsorbent (the humidity detected by the humidity sensor) increases up to a maximum value and then decreases to a substantially constant value. The maximum value or a change (increase) in the humidity from the time when the internal combustion engine is shut off to the maximum value depends on the deteriorated state of the hydrocarbon adsorbent. The predetermined time is determined to be close to a time required until the humidity represented by the output signal from the humidity sensor takes a maximum value. With the predetermined time thus established, the deteriorated state of the hydrocarbon adsorbent can be evaluated based on the output signal from the humidity sensor upon elapse of the predetermined time after the internal combustion engine is shut off, without the need for using the output signal from the humidity sensor within the steady period. Inasmuch as the output signal from the humidity sensor in the vicinity of the maximum value, or a change in the humidity from the time when the internal combustion engine is shut off to the maximum value is liable to be affected relatively greatly by differently deteriorated states of the hydrocarbon adsorbent, the deteriorated state of the hydrocarbon adsorbent can be evaluated accurately by using the output signal from the humidity sensor in the vicinity of the maximum value. By using the output signal from the humidity sensor upon elapse of the predetermined time after the internal combustion engine is shut off, the deteriorated state of the hydrocarbon adsorbent can be evaluated without the need for monitoring the output signal from the humidity sensor frequently.

The time when the humidity near the hydrocarbon adsorbent takes a maximum value is affected by the manner in which the temperature of the hydrocarbon adsorbent drops after the internal combustion engine is shut off, e.g., by a rate at which the temperature drops. The manner in which the temperature of the hydrocarbon adsorbent drops is affected by the temperature state of the hydrocarbon adsorbent when the internal combustion engine is shut off and also the temperature state outside of the exhaust passage. Generally, therefore, it takes a longer time for the temperature of the hydrocarbon adsorbent to fall as the temperature of the hydrocarbon adsorbent is higher when the internal combustion engine is shut off. Consequently, the time required until the humidity near (around) the hydrocarbon adsorbent takes a maximum value becomes longer. As the difference between the temperature of the hydrocarbon adsorbent at the time the internal combustion engine is shut off and the ambient temperature is greater, the radiation of heat from the hydrocarbon adsorbent and surrounding parts tends to be accelerated. Therefore, the time required until the humidity near the hydrocarbon adsorbent takes a maximum value becomes shorter.

According to the present invention, the predetermined time should preferably be established depending on the temperature state of the hydrocarbon adsorbent at least when the internal combustion engine is shut off. In particular, the predetermined time should preferably be established depending on the temperature state of the hydrocarbon adsorbent when the internal combustion engine is shut off and a temperature state outside of the exhaust passage.

With the predetermined time thus established, the output signal from the humidity sensor in or nearly in a state where the humidity near the hydrocarbon adsorbent actually takes a maximum value can be used for evaluating the deteriorated state of the hydrocarbon adsorbent. The deteriorated state of the hydrocarbon adsorbent can thus be evaluated more appropriately.

According to the present invention in which the output signal from the humidity sensor that is acquired upon elapse of the predetermined time is used for evaluating the deteriorated state of the hydrocarbon adsorbent, the deteriorated state of the hydrocarbon adsorbent should preferably be evaluated by comparing either the output signal of the humidity sensor acquired upon elapse of the predetermined time or a humidity represented by the output signal with a threshold established depending on the temperature state of the hydrocarbon adsorbent upon elapse of the predetermined time. Alternatively, the deteriorated state of the hydrocarbon adsorbent should preferably be evaluated by storing an output signal acquired from the humidity sensor when the internal combustion engine is shut off as a reference output signal, and comparing either a change from the reference output signal of the output signal acquired from the humidity sensor upon elapse of the predetermined time or a change in a humidity represented by the change in the output signal with a threshold established depending on the temperature state of the hydrocarbon adsorbent upon elapse of the predetermined time.

Specifically, as described above, the maximum value that the humidity detected by the humidity sensor can take, or a change (increase) in the humidity from the time when the internal combustion engine is shut off to the maximum value, depends on the deteriorated state of the hydrocarbon adsorbent. Basically, therefore, it is possible to evaluate the deteriorated state of the hydrocarbon adsorbent by comparing the output signal acquired from the humidity sensor upon elapse of the predetermined time or a change in the output signal from the reference output signal (the output signal from the humidity sensor at the time the internal combustion engine is shut off with a suitable threshold. However, as described above, the maximum amount of moisture that can be adsorbed by the hydrocarbon adsorbent, and the maximum amount of HC that can be adsorbed by the hydrocarbon adsorbent are affected by the temperature of the hydrocarbon adsorbent. Basically, the maximum amounts of moisture and HC that can be adsorbed by the hydrocarbon adsorbent are greater as the temperature of the hydrocarbon adsorbent is lower. By establishing a threshold to be compared with the output signal acquired from the humidity sensor upon elapse of the predetermined time or a humidity represented by the output signal, or to be compared with a change in the output signal of the humidity sensor from the reference output signal or a change in the humidity represented by the change in the output signal, depending on the temperature state of the hydrocarbon adsorbent upon elapse of the predetermined time (at the time the output signal from the humidity sensor for use in evaluating the deteriorated state of the hydrocarbon adsorbent), the deteriorated state of the hydrocarbon adsorbent can be evaluated more appropriately based on the output signal from the humidity sensor upon elapse of the predetermined time.

As is the case with using the output signal from the humidity sensor in the steady period for evaluating the deteriorated state of the hydrocarbon adsorbent, the temperature state of the hydrocarbon adsorbent required to establish the threshold may be a detected value or an estimated value of the temperature of the hydrocarbon adsorbent itself, or temperature data correlated to the temperature state of the hydrocarbon adsorbent may be used as a substitute representing the temperature state of the hydrocarbon adsorbent. The temperature state of the hydrocarbon adsorbent which is to be recognized to establish the threshold is not required to be strictly a temperature state at the same time as the time when the predetermined time elapses (when the output signal from the humidity sensor for evaluating the deteriorated state of the hydrocarbon adsorbent, but may be a temperature state at any time near that time.

The output signal from the humidity sensor often tends to change under the influence of the temperature state of the humidity sensor (or more specifically, the temperature state of an element (sensor body) that is sensitive to the humidity). Therefore, in a situation where the temperature state of the humidity sensor at the time of acquiring the output signal from the humidity sensor (the output signal may hereinafter be referred to as "deterioration evaluating output signal") for use in evaluating the deteriorated state of the hydrocarbon adsorbent changes depending on operating conditions of the internal combustion engine before it is shut off or conditions such as an ambient condition after the internal combustion engine is shut off, it is preferable to compensate for the effect of a change in the output signal from the humidity sensor on the evaluation of the deteriorated state of the hydrocarbon adsorbent. To make such a compensation, the deteriorated state of the hydrocarbon adsorbent should preferably be evaluated based on the acquired value of the deterioration evaluating output signal of the humidity sensor and the temperature state of the humidity sensor at the time the deterioration evaluating output signal is acquired.

By thus taking into account the temperature state of the humidity sensor at the time the deterioration evaluating output signal is acquired, it is possible to evaluate the deteriorated state of the hydrocarbon adsorbent while compensating for the effect of a change in the output signal from the humidity sensor depending on the temperature state of the humidity sensor. As a result, the result of the evaluation of the deteriorated state of the hydrocarbon adsorbent is made highly reliable.

More specifically, according to the present invention in which the output signal acquired from the humidity sensor within the steady period for evaluating the deteriorated state of the hydrocarbon, the output signal acquired from the humidity sensor within the steady period is corrected depending on the temperature state of the humidity sensor at the time the output signal from the humidity sensor is acquired. With the output signal thus corrected, it is possible to estimate an output signal of the humidity sensor corresponding to a certain constant temperature state of the humidity sensor even if the temperature state of the humidity sensor at the time the output signal thereof is acquired is indefinite. The deteriorated state of the hydrocarbon is estimated by comparing either the corrected output signal of the humidity sensor or a humidity represented by the corrected output signal with a threshold established depending on the temperature state of the hydrocarbon adsorbent at the time the output signal from the humidity sensor is acquired.

In this manner, the deteriorated state of the hydrocarbon can appropriately be evaluated without being affected by the temperature state of the humidity sensor.

Even in the case where the output signal from the humidity sensor acquired upon elapse of the predetermined time after the internal combustion engine is shut off is used in evaluating the deteriorated state of the hydrocarbon adsorbent, the effect of a change in the output signal depending on the temperature state of the humidity sensor can be compensated for. In this case, for example, the output signal from the humidity sensor at the time the internal combustion engine is shut off, as corrected depending on the temperature state of the humidity sensor at the time, is stored as a reference output signal. The output signal from the humidity sensor (the deterioration evaluating output signal) upon elapse of the predetermined time after the internal combustion engine is shut off is corrected depending on the temperature state of the humidity sensor at the time. Then, a change in the corrected deterioration evaluating output signal from the reference output signal, or a change in the humidity represented by the change in the corrected deterioration evaluating output, is compared with a given threshold which is established depending on the temperature state of the hydrocarbon adsorbent upon elapse of the predetermined time for thereby evaluating the deteriorated state of the hydrocarbon adsorbent.

For compensating for the effect of a change in the output signal from the humidity sensor depending on the temperature state of the humidity sensor, it is preferable to recognize the temperature state of the humidity sensor before the deterioration evaluating output signal of the humidity sensor is acquired, and, if the recognized temperature state is lower than a first predetermined temperature, heat the humidity sensor with a heater to increase the temperature of the humidity sensor to a temperature equal to or higher than the first predetermined temperature. Specifically, the findings of the inventor of the present invention show that if the temperature state of the humidity sensor is lower than a certain temperature (e.g., 10° C.), then the output characteristics of the humidity sensor tend to vary depending on the temperature, resulting in variations in the correlation between the output signal of the humidity sensor and the humidity.

Therefore, if the temperature state of the humidity sensor is lower than the first predetermined temperature (e.g., 10° C.), the humidity sensor is heated by the heater to increase the temperature state of the humidity sensor to a temperature state equal to or higher than the first predetermined temperature. In this manner, the deterioration evaluating output signal capable of appropriately evaluating the deteriorated state of the hydrocarbon adsorbent can be acquired reliably from the humidity sensor. As a result, the reliability of the result of the evaluation of the deteriorated state of the hydrocarbon adsorbent is increased, resulting in a better chance to evaluate the deteriorated state of the hydrocarbon adsorbent highly reliably.

According to the present invention, the deterioration evaluating output signal from the humidity sensor may be limited to an output signal acquired from the humidity sensor when the temperature state of the humidity sensor is a temperature state in a range close to a second predetermined temperature. With the deterioration evaluating output signal being thus limited to the output signal acquired from the humidity sensor, since the temperature state of the humidity sensor at the time the deterioration evaluating output signal is acquired is limited to the a temperature in the range close to the second predetermined temperature, the deterioration evaluating output signal can be used as it is in appropriately evaluating the deteriorated state of the hydrocarbon adsorbent without the need for correcting the deterioration evaluating output signal depending on the temperature state of the humidity sensor at the time the deterioration evaluating output signal is acquired. The second predetermined temperature should preferably be equal to or higher than the first predetermined temperature, e.g., in a range from 10 to 30° C.

If the deterioration evaluating output signal is limited to an output signal acquired from the humidity sensor when the temperature state of the humidity sensor is a temperature state in the range close to the second predetermined temperature, then it is preferable to recognize the temperature state of the humidity sensor before the output signal from the humidity sensor to be used for evaluating the deteriorated state of the hydrocarbon adsorbent is acquired, and, if the recognized temperature state is lower than the temperature in the range close to the second predetermined temperature, to heat the humidity sensor with a heater to increase the temperature of the humidity sensor to the temperature in the range close to the second predetermined temperature. When the temperature state of the humidity sensor is lower than the temperature in the range close to the second predetermined temperature, the humidity sensor is forcibly heated by the heater to increase the temperature state of the humidity sensor to the temperature state in the range close to the second predetermined temperature. Therefore, there is a better chance to acquire the deterioration evaluating output signal from the humidity sensor in a situation where the temperature state of the humidity sensor is in the range close to the second predetermined temperature, resulting in a better chance to evaluate the deteriorated state of the hydrocarbon adsorbent highly reliably without being affected by the temperature state of the humidity sensor.

According to the present invention, the deteriorated state of the hydrocarbon adsorbent should preferably be evaluated based on the output signal from the humidity sensor after the internal combustion engine is shut off at least under predetermined operating conditions. This allows a state of the exhaust gas (the humidity of the exhaust gas, or the like) in the exhaust passage after the internal combustion engine is shut off to be kept optimum in evaluating the deteriorated state of the hydrocarbon adsorbent. Therefore, the reliability of the evaluation of the deteriorated state of the hydrocarbon adsorbent based on the output signal from the humidity sensor can be increased.

More specifically, the predetermined operating conditions should preferably include a condition relative to an air-fuel ratio before the internal combustion engine is shut off, such that the deteriorated state of the hydrocarbon adsorbent should be evaluated based on the output signal from the humidity sensor if the air-fuel ratio at least immediately before the internal combustion engine is shut off is kept at an air-fuel ratio close to a stoichiometric air-fuel ratio continuously for a predetermined period of time.

Specifically, if the internal combustion engine is operated with the air-fuel ratio thereof being kept as an air-fuel ratio close to the stoichiometric air-fuel ratio, then the exhaust gas emitted from the internal combustion engine contains a relatively large amount of moisture, and the moisture contained in the exhaust gas has a substantially constant concentration. If, therefore, the air-fuel ratio immediately before the internal combustion engine is shut off is continuously kept as an air-fuel ratio close to the stoichiometric air-fuel ratio, then an exhaust gas containing a sufficient amount of moisture at a substantially constant concentration is present near the hydrocarbon adsorbent immediately after the internal combustion engine is shut off. Therefore, the hydrocarbon adsorbent smoothly adsorbs moisture and is saturated thereby, so that a change in the humidity near the hydrocarbon adsorbent depends distinctively on the deteriorated state of the hydrocarbon adsorbent.

Preferably, the predetermined operating conditions include a condition relative to a warmed-up state before the internal combustion engine is shut off, such that the step of evaluating the deteriorated state of the hydrocarbon adsorbent based on the output signal from the humidity sensor is carried out if an engine temperature at least immediately before the internal combustion engine is shut off is equal to or higher than a predetermined temperature. According to such a process, when the internal combustion engine is shut off when it has been warmed up sufficiently, i.e., when the air-fuel mixture is combusted stably in the internal combustion engine, and the hydrocarbon adsorbent has been heated sufficiently to release the moisture that has been adsorbed by the hydrocarbon adsorbent, the deteriorated state of the hydrocarbon adsorbent is evaluated based on the output signal from the humidity sensor. Therefore, any variations in the humidity of the exhaust gas in the hydrocarbon adsorbent immediately after the internal combustion engine is shut off are reduced, and the hydrocarbon adsorbent smoothly adsorbs a maximum amount of moisture depending on the deteriorated state thereof after the temperature of the hydrocarbon adsorbent is lowered to a certain extent. As a consequence, a change in the output signal from the humidity sensor after the internal combustion engine is shut off depends more highly reliably on the deteriorated state of the hydrocarbon adsorbent, thus increasing the accuracy with which to evaluate the deteriorated state of the hydrocarbon adsorbent based on the output signal from the humidity sensor.

According to the present invention, the output signal from the humidity sensor which is used in evaluating the deteriorated state of the hydrocarbon adsorbent is required to be in a state before the humidity near the hydrocarbon adsorbent is converged to the humidity outside of the exhaust passage. According to the present invention, therefore, the exhaust passage should preferably be arranged to hold a space around the humidity sensor in communication with the atmosphere at least through the hydrocarbon adsorbent or a catalytic converter. With the exhaust passage being thus arranged or the humidity sensor being disposed to provide the above layout, ambient air is prevented from entering the space around the humidity sensor by the hydrocarbon adsorbent and a catalytic converter (for purifying the exhaust gas). Therefore, a gas exchange between the space around the humidity sensor (near the hydrocarbon adsorbent) and the exterior is difficult to progress. Thus, the deteriorated state of the hydrocarbon adsorbent can be evaluated appropriately stably. Furthermore, the output signal from the humidity sensor which is capable of evaluating the deteriorated state of the hydrocarbon adsorbent can be obtained for an increased period of time, and the timing to acquire the output signal from the humidity sensor for evaluating the deteriorated state of the hydrocarbon adsorbent is available highly flexibly.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
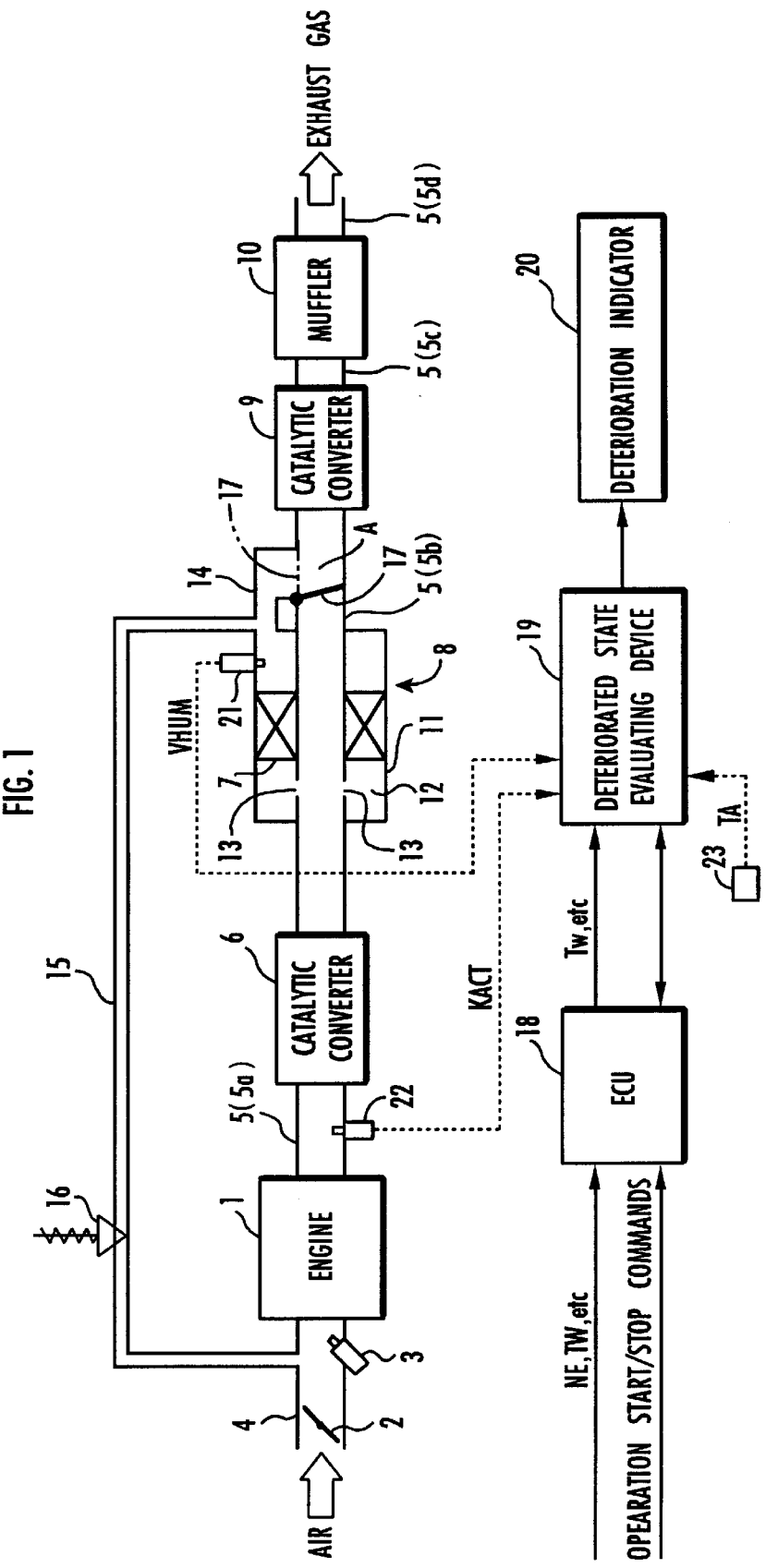
FIG. 1 is a block diagram of a system arrangement of an apparatus to which a method of evaluating a deteriorated state of a hydrocarbon adsorbent according to a first embodiment of the present invention is applied.

A method of evaluating a deteriorated state of a hydrocarbon adsorbent according to a first embodiment of the present invention will be described below with reference to FIGS. 1 through 5. FIG. 1 shows in block form a system arrangement of an apparatus to which the method according to the first embodiment is applied. As shown in FIG. 1, an internal combustion engine 1 is mounted on an automobile or a hybrid vehicle, for example. As with ordinary internal combustion engines, the internal combustion engine 1 draws a mixture of fuel and air through an intake pipe 4 having a throttle valve 2 and a fuel injector 3, combusts the mixture, and discharges an exhaust gas which is produced upon combustion of the mixture into an exhaust pipe (exhaust passage) 5. On the exhaust pipe 5, there are mounted a catalytic converter 6, an exhaust gas purifier 8 having a hydrocarbon adsorbent 7 (hereinafter referred to as "HC adsorbent 7"), and a catalytic converter 9, successively downstream in the order named, for purifying the exhaust gas emitted from the internal combustion engine 1. A muffler (silencer) 10 is also mounted on the exhaust pipe 5 downstream of the catalytic converter 9. A portion of the exhaust pipe 5 which extends upstream of the catalytic converter 5 is referred to as a first exhaust pipe 5a. A portion of the exhaust pipe 5 which extends between the catalytic converters 6, 9, i.e., a portion of the exhaust pipe 5 on which the exhaust gas purifier 8 is mounted is referred to as a second exhaust pipe 5b. A portion of the exhaust pipe 5 which extends between the catalytic converter 9 and the muffler 10 is referred to as a third exhaust pipe 5c. A portion of the exhaust pipe 5 which extends downstream of the muffler 10 is referred to as a fourth exhaust pipe 5d. The fourth exhaust pipe 5d has a downstream end open into the atmosphere.

Each of the catalytic converters 6, 9 has a three-way catalyst (not shown). The catalytic converters 6, 9 purify, by way of oxidizing and reducing reactions, gas components including nitrogen oxide (NOx), hydrocarbons (HC), carbon monoxide (CO), etc. contained in the exhaust gas emitted from the internal combustion engine 1 and supplied from the first and second exhaust pipes 5a, 5b respectively into the catalytic converters 6, 9. One of the catalytic converters 6, 9, e.g., the catalytic converter 9, may be dispensed with.

The exhaust gas purifier 8 has a substantially cylindrical housing 11 mounted on the second exhaust pipe 5b in covering relation to an outer circumferential surface thereof. The second exhaust pipe 5b extends axially centrally through the housing 11. A tubular space 12 defined between the inner circumferential surface of the housing 11 and the outer circumferential surface of the second exhaust pipe 5b serves as a bypass exhaust passage 12 for passing an exhaust gas flowing out of the second exhaust pipe 5b. The HC adsorbent 7 in a tubular form is mounted in the bypass exhaust passage 12. The HC adsorbent 7 is made of a zeolite-based material and serves to adsorb HC contained in the exhaust gas which is emitted from the internal combustion engine 1 in an initial phase of operation of the internal combustion engine 1.

The bypass exhaust passage 12 communicates with the second exhaust pipe 5b through a plurality of communication holes 13 which are defined in the wall of the second exhaust pipe 5b within the housing 11 upstream of the HC adsorbent 7. The bypass exhaust passage 12 also communicates with the second exhaust pipe 5b through a joint pipe 14 extending from the housing 11 downstream of the HC adsorbent 7. The bypass exhaust passage 12 is also connected to the intake pipe 4 downstream of the throttle valve 2 by an EGR (Exhaust Gas Recirculation) passage 15 extending from the housing 11 downstream of the HC adsorbent 7. The EGR passage 15 serves to return the exhaust gas to the intake pipe 4 under given conditions during operation of the internal combustion engine 1 in order to combust an unburned gas in the exhaust gas. An on/off solenoid-operated valve 16 is mounted in the EGR passage 15 for selectively opening and closing the EGR passage 15.

The second exhaust pipe 5b and the joint pipe 14 are joined to each other at a junction A where there is disposed a directional control valve 17 for venting one, at a time, of the portion of the second exhaust pipe 5b upstream of the junction A and the bypass exhaust passage 12 to an atmospheric side, i.e., to the catalytic converter 9 and the muffler 10. The directional control valve 17 can be actuated by an actuator such as a motor or the like. When the directional control valve 17 is actuated into a solid-line position in FIG. 1, it shields the portion of the second exhaust pipe 5b upstream of the junction A from the atmospheric side, and vents the bypass exhaust passage 12 to the atmospheric side. Conversely, when the directional control valve 17 is actuated into an imaginary-line position in FIG. 1, it vents the second exhaust pipe 5b to the atmospheric side, and shields the bypass exhaust passage 12 from the atmospheric side.

The apparatus also has, in addition to the above mechanical structures, the following components for controlling operation of the internal combustion engine 1 and evaluating a deteriorated state of the HC adsorbent 7. Specifically, the apparatus has a controller 18 (hereinafter referred to as "ECU 18") for controlling operation of the internal combustion engine 1 (including operation of the on/off valve 16 in the EGR passage 15 and the directional control valve 17), a deteriorated state evaluating device 19 for executing a processing sequence to evaluate a deteriorated state of the HC adsorbent 7, a deterioration indicator 20 for indicating the deteriorated state as evaluated, a humidity sensor 21 mounted on the housing 11 near the HC adsorbent 7 for detecting the humidity of the exhaust gas near the HC adsorbent 7, an air-fuel ratio sensor 22 mounted on the first exhaust pipe 5a upstream of the catalytic converter 6 for detecting the air-fuel ratio of the air-fuel mixture which has been combusted by the internal combustion engine 1, and an atmospheric temperature sensor 23 for detecting the temperature of the atmosphere as the temperature outside of the internal combustion engine 1 and its exhaust system (the exhaust pipe 5, etc.).

The ECU 18 and the deteriorated state evaluating device 19 are implemented by a microcomputer. The deterioration indicator 20 comprises a lamp, a buzzer, or a display unit for displaying characters, a graphic image, etc. The humidity sensor 21 is a sensor for generating an output signal depending on the humidity (relative humidity) of the exhaust gas. The air-fuel ratio sensor 22 is a sensor for generating an output signal depending on the oxygen concentration in the exhaust gas, which depends on the air-fuel ratio of the air-fuel mixture which has been combusted by the internal combustion engine 1. The atmospheric temperature sensor 23 is a sensor for generating an output signal depending on the temperature of the atmosphere. In the description which follows, the relative humidity, the air-fuel ratio, and the atmospheric temperature which are detected respectively from the output signals of the humidity sensor 21, the air-fuel ratio sensor 22, and the atmospheric temperature sensor 23 are represented respectively by VHUM, KACT, and TA. In the system shown in FIG. 1, the humidity sensor 21 is disposed downstream of the HC adsorbent 7. However, the humidity sensor 21 may be located anywhere insofar as it can detect the humidity of the exhaust gas in the vicinity of the HC adsorbent 7, and may be disposed upstream of the HC adsorbent 7. If a plurality of beds for the HC adsorbent are provided in the bypass exhaust passage 12, then the humidity sensor may be disposed between adjacent two of those beds.

The ECU 18 is supplied with detected data of the rotational speed NE of the internal combustion engine 1, the engine temperature TW thereof (specifically, the temperature of the coolant of the internal combustion engine 1), etc. from non-illustrated sensors, and also with an operation start command signal and an operation stop command signal for the internal combustion engine 1 from a non-illustrated operation switch. The ECU 18 then controls operation of the internal combustion engine 1 based on the detected data and the command signals that are supplied thereto, according to a predetermined control program. Specifically, the ECU 18 controls the opening of the throttle valve 2 with an actuator (not shown), controls the amount of fuel injected by the fuel injector 3 (controls the air-fuel ratio of the air-fuel mixture to be combusted by the internal combustion engine 1), controls an igniter (not shown), controls the starting of the internal combustion engine 1 with a starter motor (not shown), controls the on/off valve 16 mounted in the EGR passage 15, and controls operation of the directional control valve 17.

The deteriorated state evaluating device 19 is supplied with the output signal from the humidity sensor 21 (a signal indicative of a detected value of the relative humidity VHUM), the output signal from the air-fuel ratio sensor 22 (a signal indicative of a detected value of the air-fuel ratio KACT), and the output signal from the atmospheric temperature sensor 23 (a signal indicative of a detected value of the atmospheric temperature TA). The deteriorated state evaluating device 19 can exchange various data with the ECU 18. For example, the deteriorated state evaluating device 19 is supplied with data representative of the engine temperature of the internal combustion engine 1. The deteriorated state evaluating device 19 evaluates a deteriorated state of the HC adsorbent 7 of the exhaust gas purifier 8 based on the supplied data according to a predetermined program, as described later on. The deteriorated state evaluating device 19 evaluates a deteriorated state of the HC adsorbent 7 as either a state where it has been deteriorated to the extent that it needs to be replaced (such a deteriorated state will hereinafter be referred to as "deterioration-in-progress state") or a state where it has not been deteriorated to the deterioration-in-progress state (such a state will hereinafter be referred to as "non-deteriorated state"). When the deteriorated state evaluating device 19 judges that the deteriorated state of the HC adsorbent 7 is the deterioration-in-progress state, the deteriorated state evaluating device 19 controls the deterioration indicator 20 to indicate the deteriorated state as thus evaluated.

Operation of the apparatus according to the present embodiment will be described in detail below. A basic mode of operation when the internal combustion engine 1 is in operation will first be described below. When the operation switch (not shown) is turned on to start operation of the internal combustion engine 1, the ECU 18 and the deteriorated state evaluating device 19 are activated. The ECU 18 operates the directional control valve 17 to move to the solid-line position in FIG. 1 with the non-illustrated motor, and thereafter starts the internal combustion engine 1 with the starter motor (not shown), the fuel injector 3, and the igniter (not shown).

When the internal combustion engine 1 starts to operate, the exhaust gas emitted from the internal combustion engine 1 flows successively through the first exhaust pipe 5a, the catalytic converter 6, the upstream portion of the second exhaust pipe 5b which extends from the catalytic converter 6 to the communication holes 13, the bypass exhaust passage 12, the joint pipe 14, the downstream portion of the second exhaust pipe 5b which extends downstream from the directional control valve 17, the catalytic converter 9, the third exhaust pipe 5c, the muffler 10, and the fourth exhaust pipe 5d, and is discharged into the atmosphere. While the exhaust gas passes through the HC adsorbent 7 in the bypass exhaust passage 12, hydrocarbons contained in the exhaust gas are adsorbed by the HC adsorbent 7. The HC adsorbent 7 adsorbs hydrocarbons contained in the exhaust gas and also adsorbs moisture in the exhaust gas.

When the catalytic converters 6, 9 are heated and activated by the exhaust gas, the ECU 18 moves the directional control valve 7 to the imaginary-line position in FIG. 1, thus shielding the bypass exhaust passage 12 against the atmosphere and venting the second exhaust pipe 5b (upstream of the junction A) to the atmospheric side. The exhaust gas emitted from the internal combustion engine 1 is now discharged successively through the first exhaust pipe 5a, the catalytic converter 6, the second exhaust pipe 5b, the catalytic converter 9, the third exhaust pipe 5c, the muffler 10, and the fourth exhaust pipe 5d into the atmosphere. At this time, gas components including HC, CO, NOx, etc. of the exhaust gas are purified by the catalytic action (oxidizing and reducing reactions) of the catalytic converters 6, 9.

While the bypass exhaust passage 12 is being shielded against the atmosphere by the directional control valve 17, the ECU 18 opens the on/off valve 16 in the EGR passage 15 under certain conditions of the rotational speed NE and the engine temperature TW of the internal combustion engine 1. At this time, part of the exhaust gas flowing through the exhaust pipe 5 flows through the communication holes 13 in the second exhaust pipe 5b into the bypass exhaust passage 12, and flows from the bypass exhaust passage 12 through the EGR passage 15 back into the intake pipe 4 of the internal combustion engine 1. If the HC adsorbent 7 has been heated to a temperature, e.g., ranging from 100 to 250° C., high enough to release the HC adsorbed by the HC adsorbent 7 immediately after the internal combustion engine 1 has started, then the HC are released from the HC adsorbent 7, flow back into the intake pipe 4, and are combusted by the internal combustion engine 1.

While the internal combustion engine 1 is in operation, the ECU 18 basically controls the rate at which the fuel injector 3 supplies the fuel to the internal combustion engine 1 to keep the air-fuel ratio of the air-fuel mixture to be combusted by the internal combustion engine 1 close to the stoichiometric air-fuel ratio, except when the fuel supplied to the internal combustion engine 1 is cut off or the internal combustion engine 1 is operated on a lean air-fuel mixture under certain conditions.

When the operation switch (not shown) is turned off, the ECU 18 stops supplying the fuel from the fuel injector 3 to the internal combustion engine 1, thus shutting off the internal combustion engine 1.

Figure 2:
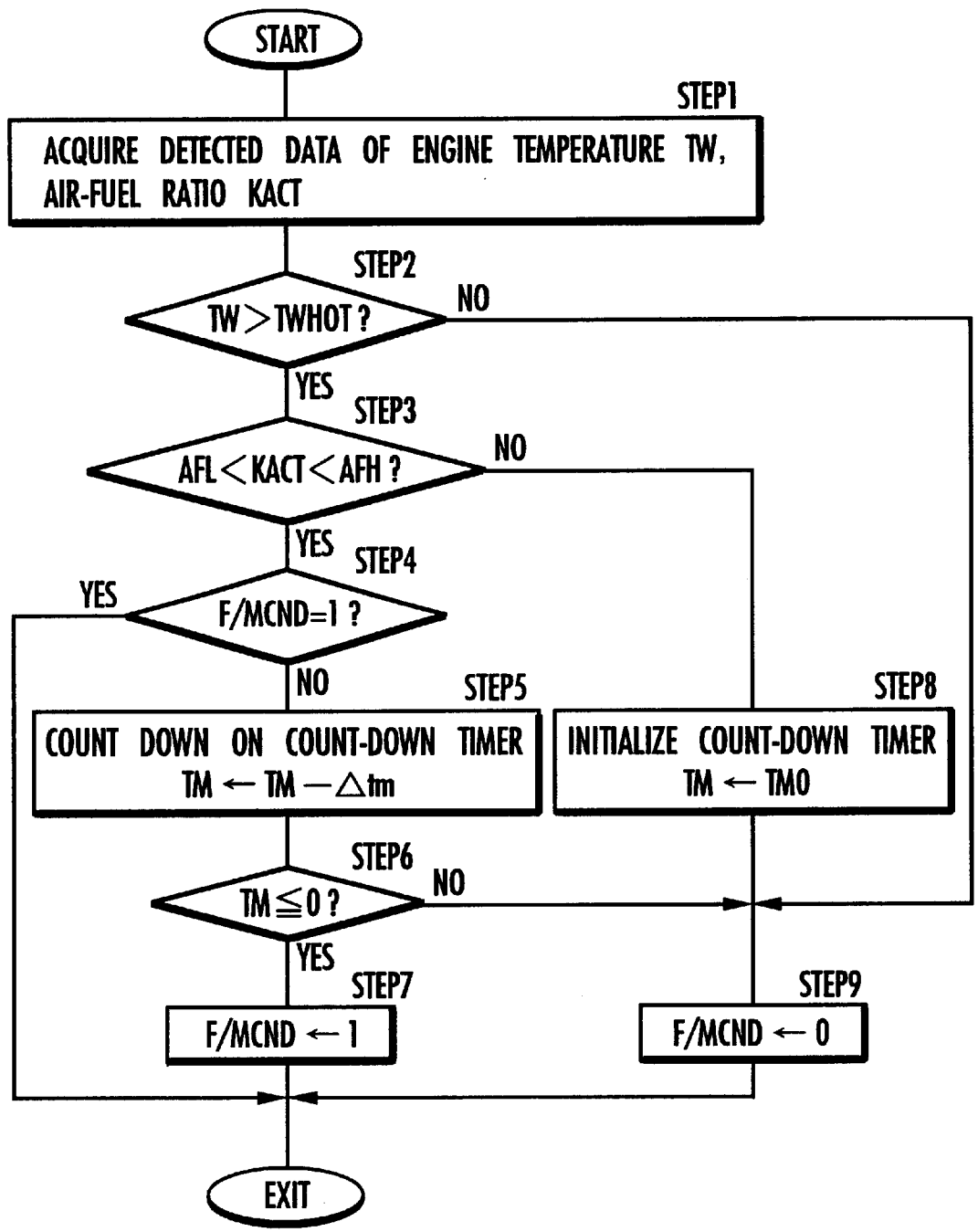
FIG. 2 is a flowchart of an operation sequence of the apparatus shown in FIG. 1.

While the internal combustion engine 1 is in operation, the deteriorated state evaluating device 19 performs an operation sequence shown in FIG. 2 in a given control cycle. In the operation sequence shown in FIG. 2, the deteriorated state evaluating device 19 acquires present detected value data of the engine temperature TW of the internal combustion engine 1 from the ECU 18 and detected value data of the air-fuel ratio KACT of the air-fuel mixture which has been combusted by the internal combustion engine 1 (hereinafter referred to as "air-fuel ratio KACT of the internal combustion engine 1") based on the present output signal of the air-fuel sensor 22 in STEP1.

Then, the deteriorated state evaluating device 19 determines whether the detected value (present value) of the engine temperature TW of the internal combustion engine 1 is higher than a predetermined value TWHOT or not in STEP 2 for thereby determining whether the internal combustion engine 1 has been warmed up sufficiently or not. The predetermined value TWHOT is set to 85° C., for example. When the engine temperature TW is higher than the predetermined value TWHOT (TW>TWHOT), the catalytic converters 6, 9 have basically been warmed and activated sufficiently, and the HC adsorbent 7 of the exhaust gas purifier 8 has been warmed to a temperature capable of releasing the adsorbed HC.

If TW≦TWHOT in STEP 2, then since given conditions for appropriately evaluating a deteriorated state of the HC adsorbent 7, i.e., conditions regarding the engine temperature TW and the air-fuel ratio KACT during operation of the internal combustion engine 1, have not been satisfied, the deteriorated state evaluating device 19 sets a flag F/MCND to "0" in STEP9, and then the present control cycle is put to an end. The flag F/MCND is a flag used when the deteriorated state evaluating device 19 executes a process of evaluating a deteriorated state of the HC adsorbent 7 while the internal combustion engine 1 is being shut off, as described later on. The flag F/MCND has an initial value of "0" at the time the internal combustion engine 1 starts to operate.

If TW>TWHOT in STEP 2, then the deteriorated state evaluating device 19 determines whether the detected value (present value) of the air-fuel ratio KACT of the internal combustion engine 1 falls in a predetermined range, i.e., a range of AFL<KACT<AFH, or not in STEP 3. The lower-limit value AFL of the range represents an air-fuel ratio slightly leaner than the stoichiometric air-fuel ratio, and the upper-limit value AFH of the range represents an air-fuel ratio slightly richer than the stoichiometric air-fuel ratio.

If the detected value of the air-fuel ratio KACT of the internal combustion engine 1 fall outside of the predetermined range, i.e., if KACT≦AFL or KACT≧AFH, in STEP 3, then the deteriorated state evaluating device 19 initializes the count value TM of a count-down timer for measuring a period of time in which the air-fuel ratio KACT is continuously kept in the above predetermined range, to a given initial value TM0 in STEP 8. Then, the deteriorated state evaluating device 19 sets the flag F/MCND to "0" in STEP9, after which the present control cycle is ended.

If AFL<KACT<AFH in STEP 3, then the deteriorated state evaluating device 19 judges the value (present value) of the flag F/MCND in STEP4. If F/MCND=1, then the deteriorated state evaluating device 19 puts the present control cycle to an end. If F/MCND=0, then the deteriorated state evaluating device 19 counts down the count value TM of the count-down timer by a given value Δtm in STEP5. The deteriorated state evaluating device 19 determines in STEP6 whether or not the count value TM is "0" or smaller, i.e., whether the state where AFL<KACT<AFH or the state where the air-fuel ratio KACT of the internal combustion engine 1 is close to the stoichiometric air-fuel ratio has continued for at least a given period of time corresponding to the initial value TM0 of the count value TM or not.

If TM>0, then the deteriorated state evaluating device 19 sets the flag F/MCND to "0" in STEP9, after which the present control cycle is ended. If TM≦0, then since the conditions for appropriately evaluating a deteriorated state of the HC adsorbent 7, i.e., the conditions regarding the engine temperature TW and the air-fuel ratio KACT during operation of the internal combustion engine 1, have been satisfied, the deteriorated state evaluating device 19 sets the flag F/MCND to "1" in STEP7. Thereafter, the present control cycle is ended.

According to the operation sequence shown in FIG. 2, if the engine temperature TW of the internal combustion engine 1 is higher than the predetermined value TWHOT and the air-fuel ratio KACT of the internal combustion engine 1 has continuously been kept close to the stoichiometric air-fuel ratio for at least the period of time corresponding to the initial value TM0 of the count value TM, then the flag F/MCND is set to "1". If the engine temperature TW of the internal combustion engine 1 is lower than the predetermined value TWHOT or the air-fuel ratio KACT falls out of a given range close to the stoichiometric air-fuel ratio due to a temporary disturbance or a fuel-cutoff operation of the internal combustion engine 1, or if the air-fuel ratio KACT has not continuously been kept close to the stoichiometric air-fuel ratio for at least the period of time corresponding to the initial value TM0 of the count value TM, then the flag F/MCND is set to "0".

The operation sequence shown in FIG. 2 is carried out only while the internal combustion engine 1 is in operation. The value of the flag F/MCND is determined while internal combustion engine 1 is being shut off. To prevent the value of the flag F/MCND from being lost while internal combustion engine 1 is being shut off, the deteriorated state evaluating device 19 stores the value of the flag F/MCND in a nonvolatile memory such as an EEPROM or the like (not shown) or a memory that is energized at all times by a battery or the like (not shown). Therefore, while internal combustion engine 1 is being shut off, the flag F/MCND is set to "1" only if the engine temperature TW of the internal combustion engine 1 is higher than the predetermined value TWHOT and the air-fuel ratio KACT of the internal combustion engine 1 has continuously been kept close to the stoichiometric air-fuel ratio for at least the period of time corresponding to the initial value TM0 of the count value TM immediately before the internal combustion engine 1 is shut off.

Figure 3:
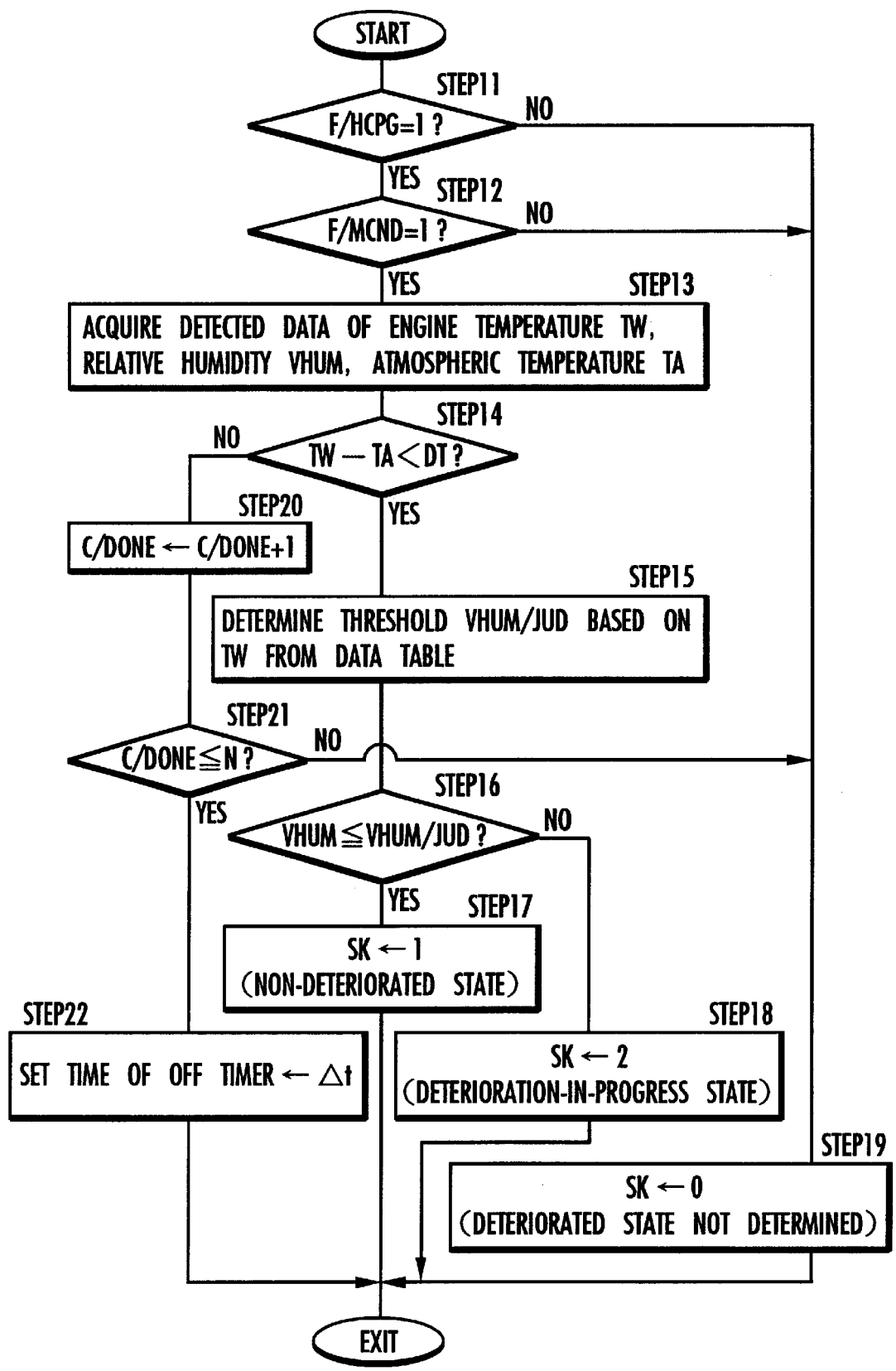
FIG. 3 is a flowchart of an operation sequence of the apparatus shown in FIG. 1.

The deteriorated state evaluating device 19, which executes the operation sequence shown in FIG. 2 during operation of the internal combustion engine 1, carries out an operation sequence shown in FIG. 3 at a given time during shutdown of the internal combustion engine 1, for thereby evaluating a deteriorated state of the HC adsorbent 7. Prior to describing the operation sequence shown in FIG. 3 (hereinafter referred to as "deterioration evaluating process"), time-dependent changes of the relative humidity VHUM (relative humidity near the HC adsorbent 7) detected based on the output signal from the humidity sensor 21 and time-dependent changes of the engine temperature TW of the internal combustion engine 1 during shutdown of the internal combustion engine 1, and a basic concept of a process of evaluating a deteriorated state of the HC adsorbent 7 according to the present embodiment will first be described below.

Figure 4:
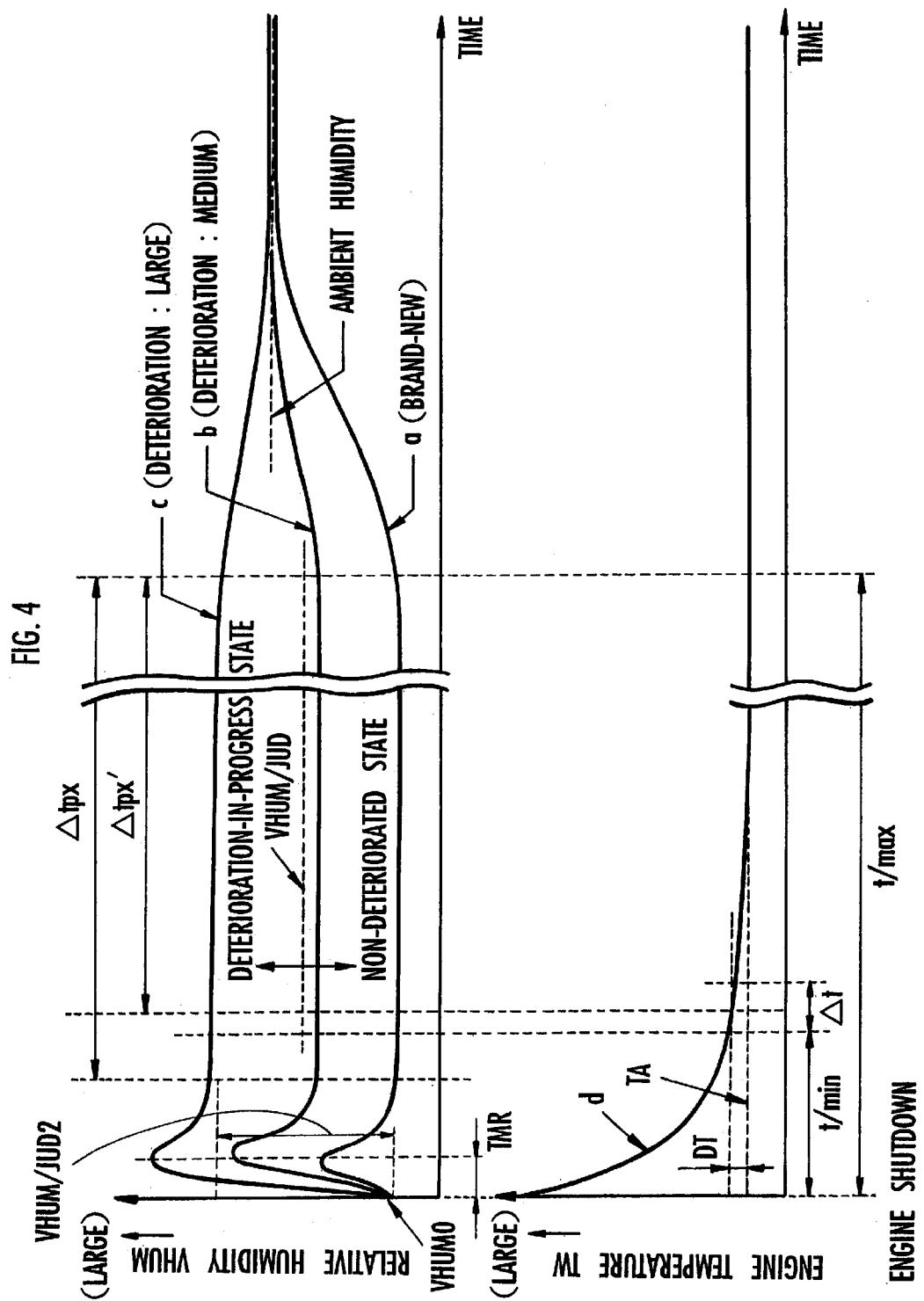
FIG. 4 is a graph illustrative of the principles of a method of evaluating a deteriorated state of a hydrocarbon adsorbent according to the present invention.

FIG. 4 shows, in an upper section thereof, curves a, b, c representing time-depending changes of the detected value of the relative humidity VHUM from the humidity sensor 21 after the internal combustion engine 1 is shut off, the curves a, b, c corresponding respectively to a brand-new HC adsorbent 7 (not deteriorated), a mediumly deteriorated HC adsorbent 7, and a largely deteriorated HC adsorbent 7. FIG. 4 also shows, in a lower section thereof, a curve d representing time-depending changes of the detected value of the engine temperature TW after the internal combustion engine 1 is shut off.

As can be seen from the curves a, b, c in FIG. 4, the relative humidity VHUM near the HC adsorbent 7 as detected by the humidity sensor 21 increases immediately after the internal combustion engine 1 is shut off (several tens minutes to several hours after the internal combustion engine 1 is shut off) because the saturated water vapor pressure is lowered due to a reduction in the temperature of the exhaust gas purifier 8, etc. When the temperature of the HC adsorbent 7 of the exhaust gas purifier 8 drops to a value for adsorbing moisture as well as HC in the exhaust gas, since the HC adsorbent 7 starts to adsorbs moisture in the exhaust gas present around the HC adsorbent 7, the relative humidity VHUM near the HC adsorbent 7 reaches a maximum value and then decreases. As the HC adsorbent 7 is deteriorated to a larger extent, i.e., as the ability thereof to adsorb HC and moisture is lowered to a larger extent, the rate at which the HC adsorbent 7 adsorbs moisture is reduced. Therefore, a change (an increase) in the relative humidity VHUM from its value VHUM0 at the time the internal combustion engine 1 is shut off to the maximum value thereof is greater as the HC adsorbent 7 is deteriorated to a larger extent and smaller as the HC adsorbent 7 is deteriorated to a smaller extent, as indicated by the curves a, b, c.

When the HC adsorbent 7 continuously adsorbs moisture until it is saturated, the reduction in the relative humidity VHUM near the HC adsorbent 7 is finished, and the relative humidity VHUM has minimum time-dependent changes and becomes substantially constant for a relatively long period Δtpx in FIG. 4. As the HC adsorbent 7 is deteriorated to a larger extent, the maximum amount of moisture which can be adsorbed by the HC adsorbent 7 is smaller. The level of the relative humidity VHUM as it is substantially constant near the HC adsorbent 7 is higher as the HC adsorbent 7 is deteriorated to a larger extent and lower as the HC adsorbent 7 is deteriorated to a smaller extent, as indicated by the curves a, b, c.

When the period of time that has elapsed after the internal combustion engine 1 is shut off, i.e., the period of time that has elapsed during shutdown of the internal combustion engine 1, becomes sufficient long, because a gas exchange between the interior of the exhaust pipe 5 and the bypass exhaust passage 12 and the atmosphere gradually progresses, the relative humidity VHUM near the HC adsorbent 7 finally converges to the ambient humidity, which is the atmospheric humidity outside of the exhaust pipe 5 and the bypass exhaust passage 12, as indicated by right portions of the curves a, b, c.

The time when the period Δtpx (hereinafter referred to as "steady humidity period Δtpx") in which the relative humidity VHUM near the HC adsorbent 7 is actually substantially constant starts depends on the temperature of the exhaust system (the exhaust gas purifier 8, etc.), the atmospheric temperature TA, the volume of the HC adsorbent, etc. at the time the internal combustion engine 1 is shut off. With the system according to the present embodiment, the steady humidity period Δtpx starts when about two through four hours have elapsed after the internal combustion engine 1 is shut off. The steady humidity period Δtpx ends depending on the structure of the exhaust system from the exhaust gas purifier 8 to the downstream end of the exhaust pipe 5. With the system according to the present embodiment, the steady humidity period Δtpx ends when about 24 through 72 hours, representing a period t/max in FIG. 4, have elapsed after the internal combustion engine 1 is shut off.

As can be seen from the curve d in FIG. 4, the engine temperature TW of the internal combustion engine 1 gradually drops after the internal combustion engine 1 is shut off, and is finally converged to the atmospheric temperature TA detected by the atmospheric temperature sensor 23. The temperature of the exhaust system of the internal combustion engine 1, e.g., the temperature of the exhaust gas purifier 8, also basically drops according to the tendency of the engine temperature TW, and is finally converged to the atmospheric temperature TA. When the engine temperature TW and the temperature of the exhaust system of the internal combustion engine 1, e.g., the exhaust gas purifier 8, etc., drop to a temperature equivalent to the atmospheric temperature TA, since the saturated water vapor pressure present in the exhaust system becomes substantially constant, the relative humidity VHUM near the HC adsorbent 7 basically becomes substantially constant.

As described above, the relative humidity VHUM near the HC adsorbent 7 during the steady humidity period Δtpx is substantially constant and the level of the substantially constant relative humidity VHUM depends on the deteriorated state of the HC adsorbent 7. According to the present embodiment, therefore, the relative humidity VHUM detected by the humidity sensor 21 in the steady humidity period Δtpx is compared with a predetermined threshold VHUM/JUD (see FIG. 4) which is set as described later on, to evaluate whether the deteriorated state of the HC adsorbent 7 is the non-deteriorated state or the deterioration-in-progress state. To make such an evaluation appropriately, it is necessary to use the highly reliable detected value of the relative humidity VHUM in the steady humidity period Δtpx. In the present embodiment, after a given period of time t/min has elapsed from the shutdown of the internal combustion engine 1, the detected value of the relative humidity VHUM at the time the engine temperature TW is substantially converged to the atmospheric temperature TA is used to evaluate the deteriorated state of the HC adsorbent 7. Stated otherwise, it is assumed that the period of time in which the relative humidity VHUM near the HC adsorbent 7 is substantially constant begins from the time when the predetermined period of time t/min has elapsed and the engine temperature TW is substantially converged to the atmospheric temperature TA, and the deteriorated state of the HC adsorbent 7 is evaluated using the detected value of the relative humidity VHUM at the beginning of that period of time. The predetermined period of time t/min is basically determined such that the time when the period of time that has elapsed after the internal combustion engine 1 is shut off becomes equal to the predetermined period of time t/min is present in the steady humidity period Δtpx, and is set to two hours, for example, according to the present embodiment.

On the basis of the foregoing description, the deterioration evaluating process according to the operation sequence shown in FIG. 3 which is carried out by the deteriorated state evaluating device 19 during shutdown of the internal combustion engine 1 will be described below with reference to FIG. 3.

The system according to the present invention has a timer (not shown, hereafter referred to as "off timer") for measuring a period of time that elapses from the shutdown of the internal combustion engine 1 and activating the ECU 18 and the deteriorated state evaluating device 19 with electric energy supplied from the non-illustrated battery when the measured period of time has reached a preset period of time. The deteriorated state evaluating device 19 executes the deterioration evaluating process shown in FIG. 3 only when the ECU 18 and the deteriorated state evaluating device 19 are activated by the off timer while the internal combustion engine 1 is being shut off. The off timer is set to the predetermined period of time t/min when the internal combustion engine 1 is shut off. Therefore, the deterioration evaluating process shown in FIG. 3 is executed only when the predetermined period of time t/min (two hours in the present embodiment) has elapsed after the shutdown of the internal combustion engine 1 while the internal combustion engine 1 is being shut off.

Specifically, the deterioration evaluating process is carried out as follows: The deteriorated state evaluating device 19 determines whether the release of the HC adsorbed by the HC adsorbent 7 during the preceding operation of the internal combustion engine 1 is completed or not based on the value of a flag F/HCPG in STEP11. The flag F/HCPG is "1" if the release of the HC adsorbed by the HC adsorbent 7 is completed and "0" if the release of the HC adsorbed by the HC adsorbent 7 is not completed. The flag F/HCPG is set by the ECU 18 while the internal combustion engine 1 is in operation. The ECU 18 determines an integrated value of the amount of the gas flowing through the EGR passage 15 by opening the on/off valve 16 in the EGR passage 15 while the temperature state of the HC adsorbent 7 is equal to or higher than a temperature for releasing the HC adsorbed by the HC adsorbent 7.

When the integrated value becomes equal to or higher than a predetermined value, the ECU 18 judges that the release of the HC from the HC adsorbent 7 is completed (at this time, the release of the moisture from the HC adsorbent 7 is also completed), and sets the flag F/HCPG to "1". When the integrated value does not reach the predetermined value, the ECU 18 sets the flag F/HCPG to "0". To prevent the value of the flag F/HCPG from being lost while internal combustion engine 1 is being shut off, the deteriorated state evaluating device 19 stores the value of the flag F/HCPG in the nonvolatile memory such as an EEPROM or the like (not shown).

If F/HCPG=0 in STEP11, since the release of the HC and the moisture adsorbed by the HC adsorbent 7 during the preceding operation of the internal combustion engine 1 is not completed (the HC adsorbent 7 has already adsorbed the moisture when the internal combustion engine 1 is shut off), the deteriorated state evaluating device 19 sets an evaluation result parameter SK representing an evaluation result of the deteriorated state of the HC adsorbent 7 to "0" in STEP19. Thereafter, the deterioration evaluating process shown in FIG. 3 is ended. When the evaluation result parameter SK is "0", it indicates that the evaluation of the deteriorated state of the HC adsorbent 7 is not determined. When the evaluation result parameter SK is "1", it indicates that the HC adsorbent 7 is in the non-deteriorated state. When the evaluation result parameter SK is "2", it indicates that the HC adsorbent 7 is in the deterioration-in-progress state.

If F/HCPG=1 in STEP11, i.e., if the release of the HC and the moisture adsorbed by the HC adsorbent 7 during the preceding operation of the internal combustion engine 1 is completed, the deteriorated state evaluating device 19 determines the value of the flag F/MCND set in the preceding operation of the internal combustion engine 1 in STEP12. If F/MCND=0, i.e., if the engine temperature TW is lower than the predetermined value TWHOT immediately before the internal combustion engine 1 is shut off or if the state in which the air-fuel ratio KACT immediately before the internal combustion engine 1 is shut off is kept close to the stoichiometric air-fuel ratio has not continued for the predetermined period of time, then the deteriorated state evaluating device 19 regards these conditions as inappropriate for finalizing the evaluation of the deteriorated state of the HC adsorbent 7, and sets the evaluation result parameter SK to "1" in STEP19. Thereafter, the deterioration evaluating process shown in FIG. 3 is ended.

If F/MCND=1 in STEP12, i.e., if the engine temperature TW is higher than the predetermined value TWHOT immediately before the internal combustion engine 1 is shut off and if the state in which the air-fuel ratio KACT immediately before the internal combustion engine 1 is shut off is kept close to the stoichiometric air-fuel ratio has continued for at least the predetermined period of time, then the deteriorated state evaluating device 19 acquires present detected value data of the engine temperature TW of the internal combustion engine 1 from the ECU 18, acquires present detected value data of the relative humidity VHUM near the HC adsorbent 7 (the output signal (voltage) of the humidity sensor 21 as converted into a relative humidity) based on the present output signal from the humidity sensor 21, and also acquires present detected value data of the atmospheric temperature TA (the temperature outside of the exhaust system including the exhaust gas purifier 8, etc.) in STEP13. The detected value of the relative humidity VHUM is determined from the level of the output voltage from the humidity sensor 21 according to a predetermined data table based on the output characteristics of the humidity sensor 21 or a predetermined formula.

Then, the deteriorated state evaluating device 19 determines whether the difference (TW−TA) between the present engine temperature TW and the atmospheric temperature TA is smaller than a predetermined value DT or not in STEP14. The predetermined value DT is a sufficiently small positive value. If TW−TA<DT, then it means that the engine temperature TW has dropped to a temperature (substantially constant) substantially equal to the atmospheric temperature TA and the temperature near the HC adsorbent 7 has dropped to a temperature (substantially constant) substantially equal to the atmospheric temperature TA. In STEP14, the deteriorated state evaluating device 19 uses the engine temperature TW in order to recognize the temperature state near the HC adsorbent 7. However, if the temperature near the HC adsorbent 7 is directly detected by a temperature sensor, then the deteriorated state evaluating device 19 may use the thus detected temperature near the HC adsorbent 7 instead of the engine temperature TW.

Figure 5:
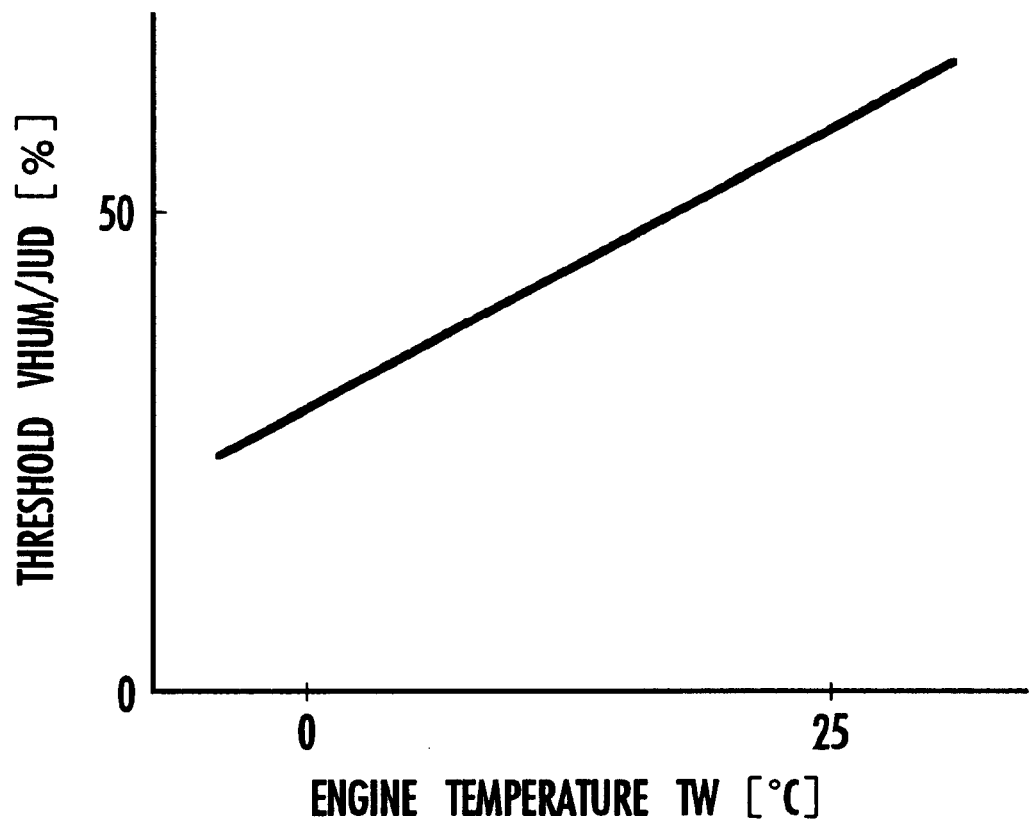
FIG. 5 is a diagram showing a data table used in the operation sequence shown in FIG. 3.

If TW−TA<DT in STEP14, i.e., if the engine temperature TW (and the temperature near the HC adsorbent 7) is substantially converged to the atmospheric temperature and is substantially constant, the relative humidity VHUM near the HC adsorbent 7 as detected by the humidity sensor 21 is substantially constant for certain. The deteriorated state evaluating device 19 now determines a predetermined threshold VHUM/JUD for evaluating the deteriorated state of the HC adsorbent 7 from a predetermined data table shown in FIG. 5 in STEP15. The threshold VHUM/JUD is a threshold to be compared with the present detected value of the relative humidity VHUM (the detected value within the steady humidity period Δtpx shown in FIG. 4) which has been acquired in STEP13. As shown in FIG. 5, the threshold VHUM/JUD is set depending on the engine temperature TW such that it is smaller as the engine temperature TW (which represents the temperature state of the HC adsorbent 7) is lower. The threshold VHUM/JUD is set depending on the engine temperature TW (the temperature state of the HC adsorbent 7) because the HC adsorbent 7 adsorbs more moisture as its temperature is lower.

Then, the deteriorated state evaluating device 19 compares the present detected value of the relative humidity VHUM acquired in STEP13 with the threshold VHUM/JUD in STEP16. If VHUM≦VHUM/JD, then the deteriorated state evaluating device 19 judges that the HC adsorbent 7 is in the non-deteriorated state (corresponding to the curves a, b shown in FIG. 4), and sets the evaluation result parameter SK to "1" in STEP17. Thereafter, the deterioration evaluating process shown in FIG. 3 is put to an end. If VHUM>VHUM/JD, then the deteriorated state evaluating device 19 judges that the HC adsorbent 7 is in the deterioration-in-progress state (corresponding to the curve c shown in FIG. 4), and sets the evaluation result parameter SK to "2" in STEP18. Thereafter, the deterioration evaluating process shown in FIG. 3 is put to an end.

When the evaluation result parameter SK is set in STEP17, STEP18, STEP19, and the deterioration evaluating process shown in FIG. 3 is ended, the deteriorated state evaluating device 19 and the ECU 18 are turned off until the operation of the internal combustion engine 1 is resumed. The value of the evaluation result parameter SK is stored in the nonvolatile memory such as an EEPROM or the like during the shutdown of the internal combustion engine 1.

According to the deterioration evaluating process shown in FIG. 3 described above, when the predetermined period of time t/min has elapsed after the internal combustion engine 1 is shut off, if the engine temperature TW (and the temperature state near the HC adsorbent 7) drops to a temperature substantially equal to the atmospheric temperature TA (except if F/HCPG=0 or F/MCND=0), the deteriorated state of the HC adsorbent 7 is evaluated.

In the above description, it is assumed that the engine temperature TW drops to a temperature substantially equal to the atmospheric temperature TA when the predetermined period of time t/min has elapsed after the internal combustion engine 1 is shut off. However, since the manner in which the engine temperature TW drops after the internal combustion engine 1 is shut off is affected by the engine temperature TW and the atmospheric temperature TA at the time the internal combustion engine 1 is shut off, the engine temperature TW may not necessarily be lowered to a temperature substantially equal to the atmospheric temperature TA when the predetermined period of time t/min has elapsed, i.e., when the deterioration evaluating process shown in FIG. 3 is executed for the first time after the internal combustion engine 1 is shut off, but it is possible that TW−TA≧DT in STEP14 shown in FIG. 3, e.g., as indicated by the curve d shown in FIG. 4. In such a case, the deteriorated state evaluating device 19 increments the value of a count parameter C/DONE representing the number of times that the deterioration evaluating process shown in FIG. 3 is executed, by "1" in STEP20, and then compares the value of the count parameter C/DONE with a predetermined upper limit value N in STEP21. If C/DONE<N, then the deteriorated state evaluating device 19 sets the set time of the offset timer to a predetermined time Δt (see FIG. 4) in STEP22. Thereafter, the deterioration evaluating process shown in FIG. 3 is ended. At this time, the deteriorated state evaluating device 19 and the ECU 18 are turned off. Therefore, after elapse of the predetermined time Δt, the off timer is actuated to activate the deteriorated state evaluating device 19 and the ECU 18, and the deteriorated state evaluating device 19 executes the deterioration evaluating process shown in FIG. 3. In the present embodiment, the predetermined time Δt is set to a time, e.g., 30 minutes, shorter than the predetermined period of time t/min (two hours in the present embodiment) which determines the time for initially executing the c. However, the predetermined time Δt may be the same as or longer than the predetermined period of time t/min. When the internal combustion engine 1 is shut off, the count parameter C/DONE is initialized to "0". While the internal combustion engine 1 is being shut off, the count parameter C/DONE is stored in the nonvolatile memory such as an EEPROM or the like.

If C/DONE>N in STEP21, i.e., if the engine temperature TW is not converged to the atmospheric temperature TA when the deterioration evaluating process shown in FIG. 3 is carried out as many times as the upper limit value N, then the deteriorated state evaluating device 19 regards this condition as inappropriate for finalizing the evaluation of the deteriorated state of the HC adsorbent 7, and sets the evaluation result parameter SK to "1" in STEP19. Thereafter, the deterioration evaluating process shown in FIG. 3 is ended. The upper limit value N is set such that the period of time that elapses from the shutdown of the internal combustion engine 1 to the time when the deterioration evaluating process is carried out in an Nth cycle terminates short of the time when the steady humidity period Δtpx is finished, i.e., is equal to or shorter than the period t/max in FIG. 4.

When the operation of the internal combustion engine 1 is resumed after the deteriorated state of the HC adsorbent 7 is evaluated during the shutdown of the internal combustion engine 1, the deteriorated state evaluating device 19 operates the deterioration indicator 20 depending on the value of the evaluation result parameter SK. Specifically, if the value of the evaluation result parameter SK is "2", i.e., if the deteriorated state of the HC adsorbent 7 is the deterioration-in-progress state, then the deterioration indicator 20 indicates the deterioration-in-progress state.

According to the above process, when the predetermined period of time t/min has elapsed after the internal combustion engine 1 is shut off, if the engine temperature TW (and the temperature state near the HC adsorbent 7) does not drop to a temperature substantially equal to the atmospheric temperature TA, then the deterioration evaluating process shown in FIG. 3 is subsequently carried out in each predetermined time Δt until the engine temperature TW drops to a temperature substantially equal to the atmospheric temperature TA.

According to the present embodiment, therefore, subsequently to the time when the predetermined period of time t/min has elapsed after the internal combustion engine 1 is shut off, when the engine temperature TW drops to a temperature substantially equal to the atmospheric temperature TA, the deteriorated state of the HC adsorbent 7 is actually evaluated, and the evaluation result parameter SK is set to "1" or "2". Inasmuch as the time t/max until the steady humidity period Δtpx in which the relative humidity VHUM is substantially constant is finished after the internal combustion engine 1 is shut off is relatively long (sufficiently longer than the predetermined period of time t/min), there is basically no situation where the engine temperature TW does not drop to a temperature substantially equal to the atmospheric temperature TA before the steady humidity period Δtpx expires. Therefore, the deterioration evaluating process shown in FIG. 3 is reliable in evaluating the deteriorated state of the HC adsorbent 7 using the detected value of the relative humidity VHUM within the steady humidity period Δtpx. Since the detected value of the relative humidity VHUM which is used to evaluate the deteriorated state of the HC adsorbent 7 is generated while the relative humidity VHUM is being substantially constant steadily, the detected value of the relative humidity VHUM can be obtained with accuracy. Thus, the evaluation of the deteriorated state of the HC adsorbent 7 based on the detected value of the relative humidity VHUM can be performed highly reliably and accurately.

The humidity sensor 21 may be able to detect the relative humidity VHUM while the relative humidity VHUM is being substantially constant. Therefore, the humidity sensor 21 is not required to be highly responsive, but may comprise a relatively inexpensive sensor.

In the present embodiment, if the value of the flag F/HCPG is "1", i.e., if it is recognized that the release of the HC and the moisture adsorbed by the HC adsorbent 7 during the preceding operation of the internal combustion engine 1 is completed, then the deteriorated state of the HC adsorbent 7 is essentially evaluated based on the detected value of the relative humidity VHUM. Stated otherwise, the deteriorated state of the HC adsorbent 7 is evaluated based on the detected value of the relative humidity VHUM while the HC adsorbent 7 has adsorbed a maximum amount of moisture which it can adsorb in the deteriorated state after the internal combustion engine 1 is shut off. In the present embodiment, furthermore, if the value of the flag F/MCND is "1", i.e., if the internal combustion engine 1 is sufficiently warmed up and the air-fuel mixture is stably combusted immediately before the internal combustion engine 1 is shut off, and also if the air-fuel ratio KACT of the internal combustion engine 1 has been kept close to the stoichiometric air-fuel ratio for the predetermined period of time, then the deteriorated state of the HC adsorbent 7 is essentially evaluated based on the detected value of the relative humidity VHUM. Stated otherwise, if the exhaust gas present around the HC adsorbent 7 contains a sufficient amount of moisture and variations in the contained amount of moisture are small immediately after the internal combustion engine 1 is shut off, then the deteriorated state of the HC adsorbent 7 is evaluated based on the detected value of the relative humidity VHUM within the steady humidity period $\Delta tpx$. As a consequence, the deteriorated state of the HC adsorbent 7 is evaluated accurately and appropriately. While the internal combustion engine 1 is being shut off, since the space near the HC adsorbent 7 including the space around the humidity sensor 21 communicates with the atmosphere through the catalytic converter 9, it is difficult for the atmospheric air to find its way into the space near the HC adsorbent 7. Therefore, the relative humidity VHUM detected by the humidity sensor 21 is kept substantially constant stable for a long period of time. As a result, the transition characteristics of the output signal (representing the detected value of the relative humidity) from the humidity sensor 21 after the internal combustion engine 1 is shut off depend stably on the deteriorated state of the HC adsorbent 7. The deteriorated state of the HC adsorbent 7 can thus be evaluated reliably and stably.

A method of evaluating a deteriorated state of a hydrocarbon adsorbent according to a second embodiment of the present invention will be described below with reference to FIG. 6. The apparatus to which the method according to the second embodiment is applied is identical in structure to the apparatus to which the method according to the first embodiment is applied. The method according to the second embodiment is different from the method according to the first embodiment with respect to a portion of the process carried out by the deteriorated state evaluating device 19. Those parts and functions according to the second embodiment which are identical to those according to the first embodiment are denoted by identical figures and reference characters, and will not be described below.

In the second embodiment, the deteriorated state evaluating device 19 operates in the same manner as the deteriorated state evaluating device 19 according to the first embodiment while the internal combustion engine 1 is in operation. Therefore, the operation sequence shown in FIG. 2 is executed by the deteriorated state evaluating device 19 while the internal combustion engine 1 is in operation. In addition, the flag F/HCPG indicative of whether the release of the HC adsorbed by the HC adsorbent 7 is completed or not is set in the same manner as the first embodiment.

In the second embodiment, when the operation of the internal combustion engine 1 is resumed after it is shut off, or more specifically, after the ECU 18 and the deteriorated state evaluating device 19 are activated and immediately before cranking is done to start the internal combustion engine 1, the deteriorated state evaluating device 19 evaluates a deteriorated state of the HC adsorbent 7.

Figure 6:
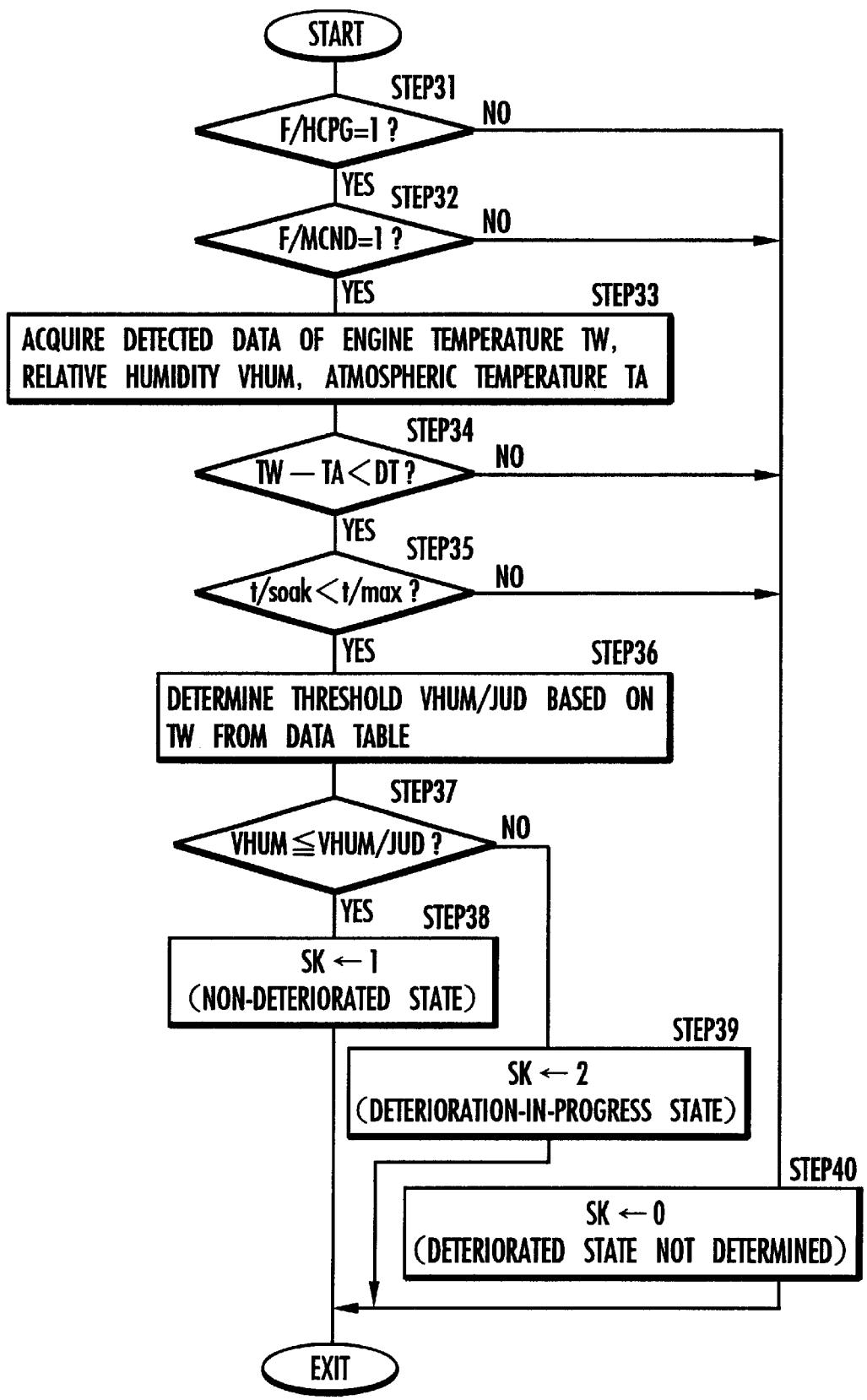
FIG. 6 is a flowchart of an operation sequence of an apparatus to which a method of evaluating a deteriorated state of a hydrocarbon adsorbent according to a second embodiment of the present invention is applied.

When the deteriorated state evaluating device 19 is activated by turning on the operation switch of the internal combustion engine 1 after the internal combustion engine 1 is shut off, the deteriorated state evaluating device 19 carries out an operation sequence (deterioration evaluating process) shown in FIG. 6. As in STEP11, STEP12 shown in FIG. 3, the deteriorated state evaluating device 19 judges the value of the flag F/HCPG and the value of the flag F/MCND respectively in STEP31, STEP32. If F/HCPG=0 or F/MCND=0, then the deteriorated state evaluating device 19 assumes that it is difficult to appropriately evaluate the deteriorated state of the HC adsorbent 7 as with the first embodiment, and sets the evaluation result parameter SK to "0" in STEP40. Then, the deterioration evaluating process shown in FIG. 6 is put to an end.

If F/HCPG=1 and F/MCND=1 in STEP31, STEP32, then the deteriorated state evaluating device 19 acquires present detected value data of the engine temperature TW of the internal combustion engine 1, the relative humidity VHUM near the HC adsorbent 7, and the atmospheric temperature TA (the temperature outside of the exhaust system including the exhaust gas purifier 8, etc.) in STEP33, as with STEP13 shown in FIG. 3 according to the first embodiment.

The deteriorated state evaluating device 19 determines whether the difference (TW−TA) between the present engine temperature TW and the atmospheric temperature TA is smaller than the predetermined value DT or not, i.e., whether the engine temperature TW and the temperature of the exhaust system including the exhaust gas purifier 8, etc. are substantially converged to the atmospheric temperature TA or not in STEP34, as with STEP14 shown in FIG. 3 according to the first embodiment.

If TW−TA$\geq$DT, then deteriorated state evaluating device 19 sets the evaluation result parameter SK to "0", making the evaluation of the HC adsorbent 7 undetermined in STEP40. Then, the deterioration evaluating process shown in FIG. 6 is ended.

If TW−TA<DT, then the deteriorated state evaluating device 19 determines whether an elapsed time t/soak after the internal combustion engine 1 is shut off has reached the period t/max which is determined as the time t/max (see FIG. 4) up to the end of the steady humidity period $\Delta tpx$ or not (t/soak<t/max or not) in STEP35. The elapsed time t/soak is measured by a timer (not shown) which is activated when the internal combustion engine 1 is shut off. The time t/max up to the end of the steady humidity period $\Delta tpx$ from the shutdown of the internal combustion engine 1 is experimentally determined in view of the arrangement of the exhaust system of the internal combustion engine 1, particularly the arrangement of the exhaust system downstream of the exhaust gas purifier 8, and is set to a period of time ranging from 24 hours to 72 hours, for example.

If t/soak$\geq$t/max in STEP35, then the detected value of the relative humidity VHUM detected by the humidity sensor 21 is possibly converted, or being converted, to the ambient humidity. In this case, the deteriorated state evaluating device 19 does not essentially evaluate the deteriorated state of the HC adsorbent 7, but sets the evaluation result parameter SK to "0" in STEP40. Thereafter, the deterioration evaluating process shown in FIG. 6 is ended.

If t/soak<t/max in STEP35, then the deteriorated state evaluating device 19 performs the same processing as STEP15, STEP16, STEP17, STEP18 shown in FIG. 3 according to the first embodiment respectively in STEP36, STEP37, STEP38, STEP39, for thereby essentially evaluating the deteriorated state of the HC adsorbent 7. Specifically, the deteriorated state evaluating device 19 determines a predetermined threshold VHUM/JUD for evaluating whether the deteriorated state of the HC adsorbent 7 is the non-deteriorated state or the deterioration-in-progress state based on the present detected value of the engine temperature TW acquired in STEP33 from the data table shown in FIG. 5 in STEP36. Then, the deteriorated state evaluating device 19 compares the present detected value of the relative humidity VHUM acquired in STEP33 with the threshold VHUM/JUD in STEP37. If VHUM≦VHUM/JD, then the deteriorated state evaluating device 19 judges that the HC adsorbent 7 is in the non-deteriorated state, and sets the evaluation result parameter SK to "1" in STEP38. Thereafter, the deterioration evaluating process shown in FIG. 6 is put to an end. If VHUM>VHUM/JD, then the deteriorated state evaluating device 19 judges that the HC adsorbent 7 is in the deterioration-in-progress state, and sets the evaluation result parameter SK to "2" in STEP39. Thereafter, the deterioration evaluating process shown in FIG. 6 is put to an end.

After the deteriorated state of the HC adsorbent 7 is evaluated when the internal combustion engine 1 starts to operate, the deteriorated state evaluating device 19 operates the deterioration indicator 20 depending on the value of the evaluation result parameter SK while the internal combustion engine 1 is in operation, as with the first embodiment. Specifically, when the evaluation result parameter SK is set to "2", indicating that the HC adsorbent 7 is in the deterioration-in-progress state, then the deterioration indicator 20 indicates the deterioration-in-progress state.

According to the above process, if the operation of the internal combustion engine 1 is resumed within a period (period Δtpx' in FIG. 4) from the time when the engine temperature TW (and the temperature of the exhaust gas purifier 8) has dropped to a temperature substantially equal to the atmospheric temperature TA until the elapsed time t/soak after the internal combustion engine 1 is shut off reaches the period t/max, then the deteriorated state of the HC adsorbent 7 is essentially evaluated on the basis of the detected value of the relative humidity VHUM at the start of the operation of the internal combustion engine 1 (before the internal combustion engine 1 is activated). As with the first embodiment, the deteriorated state of the HC adsorbent 7 is evaluated using the detected value of the relative humidity VHUM within the steady humidity period Δtpx in which the relative humidity VHUM is substantially constant for certain. Furthermore, as with the first embodiment, the deteriorated state of the HC adsorbent 7 is not essentially evaluated if the value of the flag F/HCPG or F/MCND is "0", i.e., if the release of the HC and the moisture adsorbed by the HC adsorbent 7 is not completed while the internal combustion engine 1 is in operation, or if the air-fuel ratio KACT and the engine temperature TW immediately before the internal combustion engine 1 is shut off do not satisfy the given conditions. Therefore, as with the first embodiment, the deteriorated state of the HC adsorbent 7 can be evaluated accurately and appropriately. Since the space around the humidity sensor 21 near the HC adsorbent 7 communicates with the atmosphere through the catalytic converter 9 as with the first embodiment, the deteriorated state of the HC adsorbent 7 can be evaluated stably as with the first embodiment.

A method of evaluating a deteriorated state of a hydrocarbon adsorbent according to a third embodiment of the present invention will be described below with reference to FIGS. 7 through 11. The apparatus to which the method according to the third embodiment is applied is identical in structure to the apparatus to which the method according to the first embodiment is applied. The method according to the third embodiment is different from the method according to the first embodiment with respect to the process carried out by the deteriorated state evaluating device 19. Those parts and functions according to the third embodiment which are identical to those according to the first embodiment are denoted by identical figures and reference characters, and will not be described below.

In the third embodiment, the deteriorated state evaluating device 19 executes the operation sequence shown in FIG. 2 while the internal combustion engine 1 is in operation. In addition, while the internal combustion engine 1 is in operation, the flag F/HCPG indicative of whether the release of the HC and the moisture adsorbed by the HC adsorbent 7 is completed or not is set in the same manner as the first embodiment.

Figure 7:
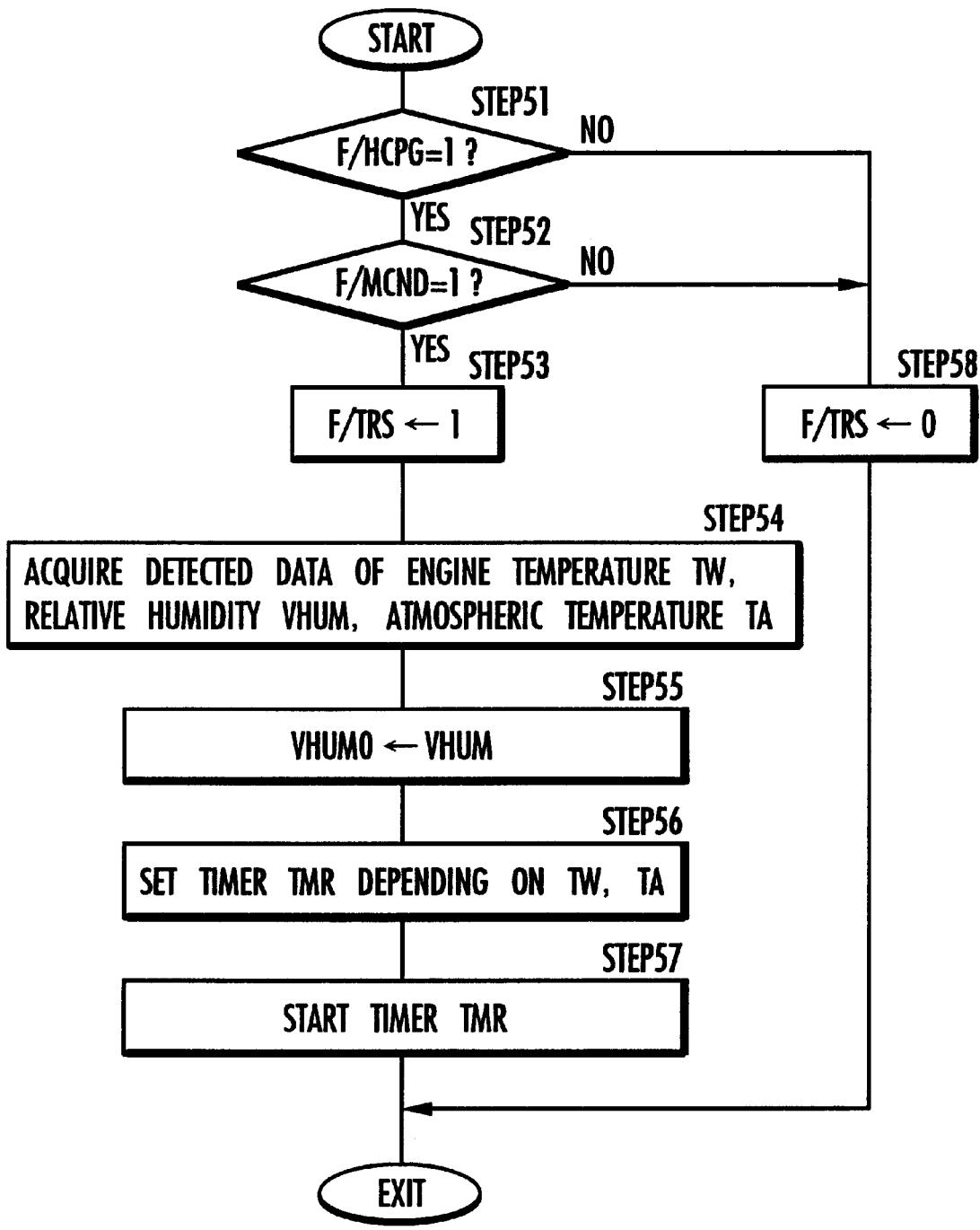
FIG. 7 is a flowchart of an operation sequence of an apparatus to which a method of evaluating a deteriorated state of a hydrocarbon adsorbent according to a third embodiment of the present invention is applied.

In the third embodiment, furthermore, the deteriorated state evaluating device 19 carries out an operation sequence shown in FIG. 7 when the internal combustion engine 1 is shut down, i.e., when a process for shutting down the internal combustion engine 1 is carried out. In the operation sequence shown in FIG. 7, the deteriorated state evaluating device 19 judges the values of the flags F/HCPG and F/MCND in STEP51, STEP52 as in STEP11, STEP12 shown in FIG. 3 according to the first embodiment. If F/HCPG=0 or F/MCND=0, then the deteriorated state evaluating device 19 assumes that conditions capable of appropriately evaluating the deteriorated state of the HC adsorbent 7 are not satisfied, and sets a flag F/TRS to "0" in STEP58. Then, the process shown in FIG. 7 is put to an end. When the value of the flag F/TRS is "1", it indicates that the conditions capable of appropriately evaluating the deteriorated state of the HC adsorbent 7 are satisfied, and when the value of the flag F/TRS is "0", it indicates that those conditions are not satisfied.

If F/HCPG=1 and F/MCND=1 in STEP51, STEP52, then the deteriorated state evaluating device 19 judges that the conditions capable of appropriately evaluating the deteriorated state of the HC adsorbent 7 are satisfied, and sets the flag F/TRS to "1" in STEP53. Then, the deteriorated state evaluating device 19 executes STEP54 through STEP57.

Specifically, the deteriorated state evaluating device 19 acquires present detected value data (when the internal combustion engine 1 is shut off) of the engine temperature TW of the internal combustion engine 1, the relative humidity VHUM, and the atmospheric temperature TA in STEP54. The deteriorated state evaluating device 19 stores the acquired detected value of the relative humidity VHUM as a reference humidity VHUM0 in STEP55. To prevent the value of the reference humidity VHUM0 from being lost while internal combustion engine 1 is being shut off, the deteriorated state evaluating device 19 stores the value of the reference humidity VHUM0 in the nonvolatile memory such as an EEPROM or the like. In STEP56, the deteriorated state evaluating device 19 sets a time in a timer TMR depending on the detected values of the engine temperature TW and the atmospheric temperature TA which have been acquired in STEP54. The timer TMR is a timer for activating the deteriorated state evaluating device 19, etc. to determine a time to carry out a process of evaluating a substantial deteriorated state of the HC adsorbent 7. The time set in the timer TMR is represented by the time which has elapsed from the shutdown of the internal combustion engine 1 (see FIG. 4).

Figure 8:
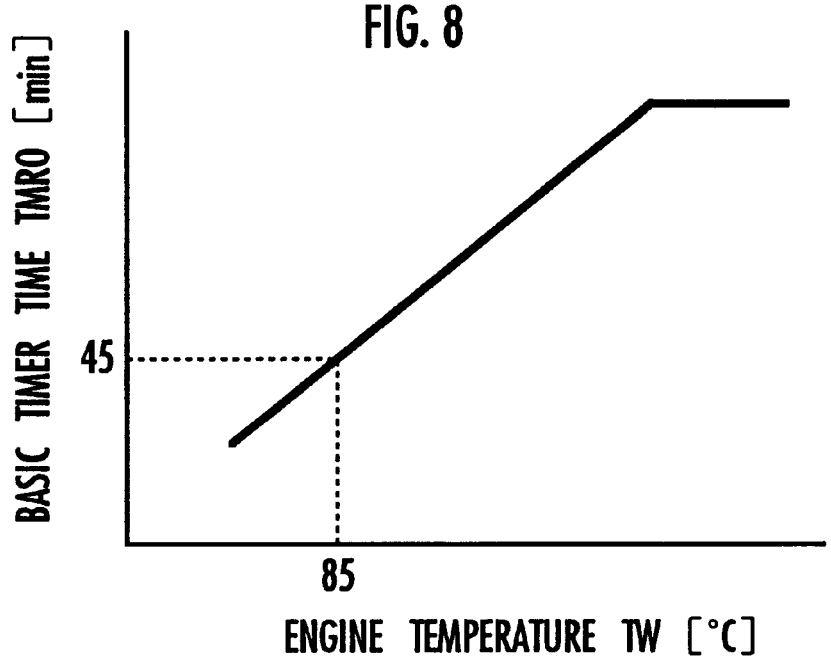
FIG. 8 is a diagram showing a data table used in the operation sequence shown in FIG. 7.

According to the present embodiment, the time in the timer TMR is set as follows: The deteriorated state evaluating device 19 determines a basic timer time TMR0 based on the detected value of the engine temperature TW from a data table determined as shown in FIG. 8. The basic timer time TMR0 is basically determined such that it is longer as the engine temperature TW is higher. The basic timer time TMR0 is determined such that it is about 45 minutes, for example, when the engine temperature TW is 85° C. (=TWHOT), and has a value ranging from several tens minutes to several hours.

Figure 9:
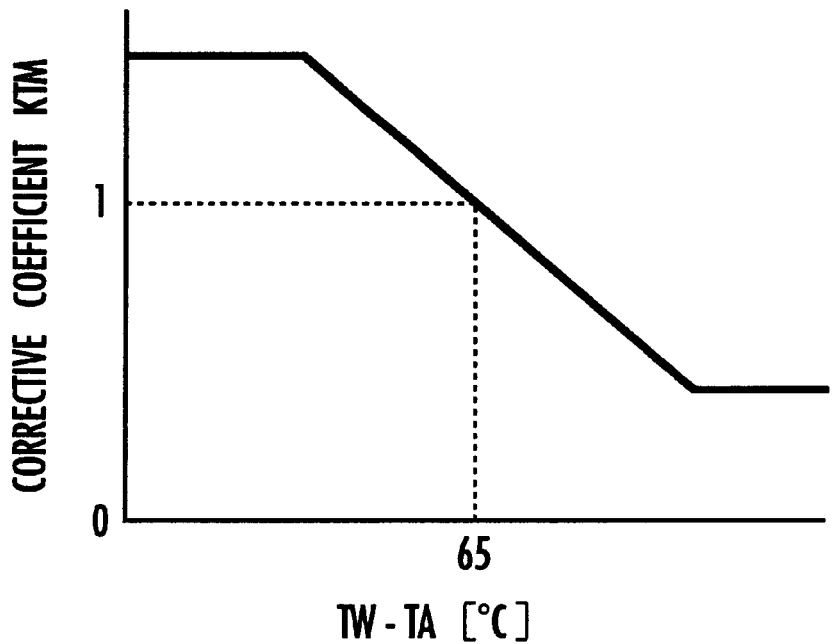
FIG. 9 is a diagram showing a data table used in the operation sequence shown in FIG. 7.

The deteriorated state evaluating device 19 determines a corrective coefficient KTM for correcting the basic timer time TMR0 based on the difference (TW−TA) between the detected value of the engine temperature TW and the detected value of the atmospheric temperature TA from a data table determined as shown in FIG. 9. The corrective coefficient KTM is a positive corrective coefficient by which to multiply the basic timer time TMR0, and is basically of a smaller value as the difference (TW−TA) is greater. For example, when the engine temperature TW is 85° C. (=TWHOT) and the atmospheric temperature TA is 20° C. (normal temperature) (TW−TA=65° C.), the corrective coefficient KTM is KTM=1. The deteriorated state evaluating device 19 multiplies the basic timer time TMR0 by the corrective coefficient KTM to set the time in the timer TMR (=TMR0·KTM).

The time thus set in the timer TMR is basically a period of time from the shutdown of the internal combustion engine 1 until the relative humidity VHUM near the HC adsorbent 7 as detected by the relative humidity sensor 21 takes substantially a maximum value. Stated conversely, the data tables shown in FIGS. 8 and 9 are determined based on various experiments such that the time in the timer TMR is substantially in agreement with a time until the relative humidity VHUM near the HC adsorbent 7 takes a maximum value after the internal combustion engine 1 is shut off. The time in the timer TMR may be set from the detected values of the engine temperature TW and the atmospheric temperature TA using a map or the like.

Referring back to FIG. 7, after having set a time in the timer TMR in STEP56, the deteriorated state evaluating device 19 starts the timer TMR to carry out a time measuring process in STEP57. Then, the process shown in FIG. 7 is ended. If the flag F/TRS is set to "0" in STEP58, then the time measuring process of the timer TMR is not carried out.

In the present embodiment, after the internal combustion engine 1 is shut off, the deteriorated state of the HC adsorbent 7 is evaluated using the output signal of the humidity sensor 21 (the detected value of the relative humidity VHUM) at the time when the relative humidity VHUM near the HC adsorbent 7 becomes substantially maximum. This evaluating process (deterioration evaluating process) is carried out while the internal combustion engine 1 is being shut off, as follows:

When the time set in the timer TMR has elapsed after the internal combustion engine 1 is shut off, the ECU 18 and the deteriorated state evaluating device 19 are supplied with electric energy from the non-illustrated battery, and are activated. At this time, the deteriorated state evaluating device 19 executes a process (deterioration evaluating process) shown in FIG. 10 to evaluate a deteriorated state of the HC adsorbent 7.

Figure 11:
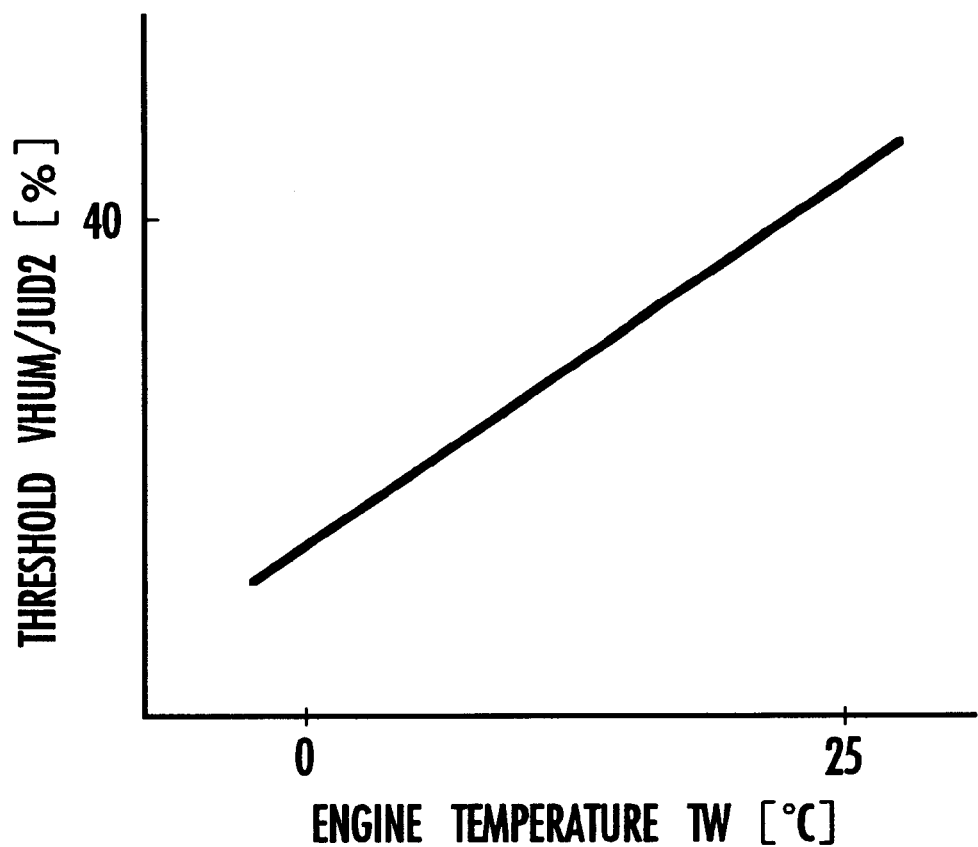
FIG. 11 is a diagram showing a data table used in the operation sequence shown in FIG. 10.

The deteriorated state evaluating device 19 acquires detected value data of the engine temperature TW as indicating a present temperature state of the HC adsorbent 7 from the ECU 18, and also acquires detected value data of the relative humidity VHUM near the HC adsorbent 7 based on the output signal from the humidity sensor 21 in STEP61. Then, the deteriorated state evaluating device 19 determines a threshold VHUM/JUD2 for evaluating whether the HC adsorbent 7 is in the non-deteriorated state or the deterioration-in-progress state based on the detected value of the engine temperature TW acquired in STEP61 from a data table shown in FIG. 11 in STEP62. The data table shown in FIG. 11 is established such that the threshold VHUM/JUD2 is smaller as the engine temperature TW (which represents the temperature state of the HC adsorbent 7) is lower.

Then, the deteriorated state evaluating device 19 compares, in STEP63, the difference (VHUM−VHUM0) between the detected value of the relative humidity VHUM acquired in STEP61 and the reference humidity VHUM0 stored when the internal combustion engine 1 was previously shut off, i.e., a change (increase) in the relative humidity VHUM from the time when the internal combustion engine 1 was shut off to the present time (at which the relative humidity VHUM near the HC adsorbent 7 is basically close to the maximum value), with the threshold VHUM/JUD2 established in STEP62.

If VHUM−VHUM0≦VHUM/JUD2 (the curves a, b in FIG. 4), then the deteriorated state evaluating device 19 judges that the HC adsorbent 7 is in the non-deteriorated state and sets the evaluation result parameter SK to "1" in STEP64. If VHUM−VHUM0>VHUM/JUD2 (the curve c in FIG. 4), then the deteriorated state evaluating device 19 judges that the HC adsorbent 7 is in the deterioration-in-progress state and sets the evaluation result parameter SK to "0" in STEP65. The deterioration evaluating process shown in FIG. 10 is now put to an end.

Figure 10:
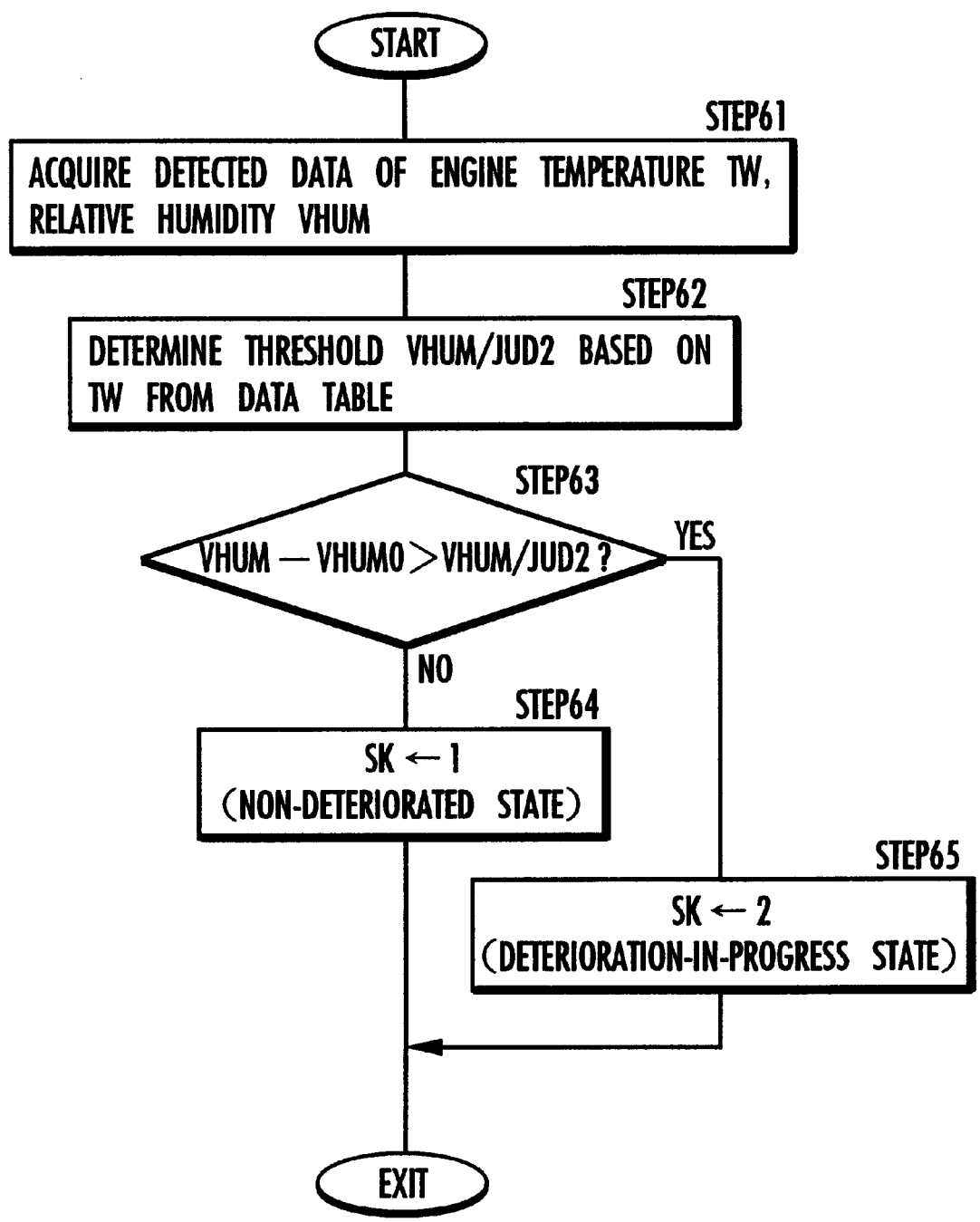
FIG. 10 is a flowchart of an operation sequence of the apparatus shown in FIG. 7.

When the deterioration evaluating process shown in FIG. 10 is ended, the deteriorated state evaluating device 19 and the ECU 18 are turned off and remains de-energized until the operation of the internal combustion engine 1 is resumed. The value of the evaluation result parameter SK is stored in the nonvolatile memory such as an EEPROM or the like during the shutdown of the internal combustion engine 1. When the operation of the internal combustion engine 1 is subsequently resumed, the deteriorated state evaluating device 19 operates the deterioration indicator 20 depending on the value of the evaluation result parameter SK as with the first embodiment.

In the above process carried out by the deteriorated state evaluating device 19, the deteriorated state of the HC adsorbent 7 is evaluated based on the detected value of the relative humidity VHUM upon elapse of the time set in the timer TMR (or more specifically, the change of the detected value of the relative humidity VHUM from the reference humidity VHUM0) after the internal combustion engine 1 is shut off. Upon elapse of the time set in the timer TMR, the relative humidity VHUM detected by the humidity sensor 21 is generally close to the maximum value. As described above with reference to FIG. 4, the change of the relative humidity VHUM from the value at the time of the shutdown of the internal combustion engine 1 to the maximum value of the relative humidity VHUM is relatively distinctly large as the extent of deterioration of the HC adsorbent 7 is greater. Therefore, the deteriorated state of the HC adsorbent 7 can appropriately be evaluated by comparing the difference between the detected value of the relative humidity VHUM upon elapse of the time set in the timer TMR and the reference humidity VHUM0 at the time the internal combustion engine 1 is shut off with the threshold VHUM/JUD2.

In the third embodiment, as with the first and second embodiments, the deteriorated state of the HC adsorbent 7 is essentially evaluated by the deterioration evaluating process shown in FIG. 10 only when the air-fuel ratio KACT and the engine temperature TW immediately prior to the shutdown of the internal combustion engine 1 satisfy the given conditions (F/TRS=1). Accordingly, the deteriorated state of the HC adsorbent 7 can appropriately be evaluated. Furthermore, since the space around the humidity sensor 21 near the HC adsorbent 7 communicates with the atmosphere through the catalytic converter 9 as with the first and second embodiments, the deteriorated state of the HC adsorbent 7 can be evaluated stably.

In the third embodiment, after the internal combustion engine 1 is shut off, the difference between the detected value of the relative humidity VHUM upon elapse of the time set in the timer TMR and the reference humidity VHUM0 at the time the internal combustion engine 1 is shut off is used to evaluate the deteriorated state of the HC adsorbent 7. The relative humidity of the exhaust gas (which corresponds to the reference humidity VHUM0) when the internal combustion engine 1 is shut off after the internal combustion engine 1 has normally been operated for a certain period of time remains substantially constant. Therefore, the deteriorated state of the HC adsorbent 7 may be evaluated by comparing the detected value of the relative humidity VHUM upon elapse of the time set in the timer TMR with a given threshold as with the third embodiment, after the internal combustion engine 1 is shut off. The threshold to be used in such a modification may be of a value represented by the sum of the threshold VHUM/JUD2 established in a data table shown in FIG. 11 and the reference humidity VHUM0.

In the first through third embodiments, the output signal (voltage signal) of the humidity sensor 21 is converted into the relative humidity VHUM to evaluate the deteriorated state of the HC adsorbent 7. However, the output signal of the humidity sensor 21 may directly be used to evaluate the deteriorated state of the HC adsorbent 7.

A method of evaluating a deteriorated state of a hydrocarbon adsorbent according to a fourth embodiment of the present invention will be described below with reference to FIGS. 12 through 15. The apparatus to which the method according to the fourth embodiment is applied differs from the apparatus to which the method according to the first embodiment is applied with respect to the humidity sensor and a portion of the process carried out by the deteriorated state evaluating device. Those parts and functions according to the fourth embodiment which are identical to those according to the first embodiment are denoted by identical figures and reference characters, and will not be described below.

Figure 12:
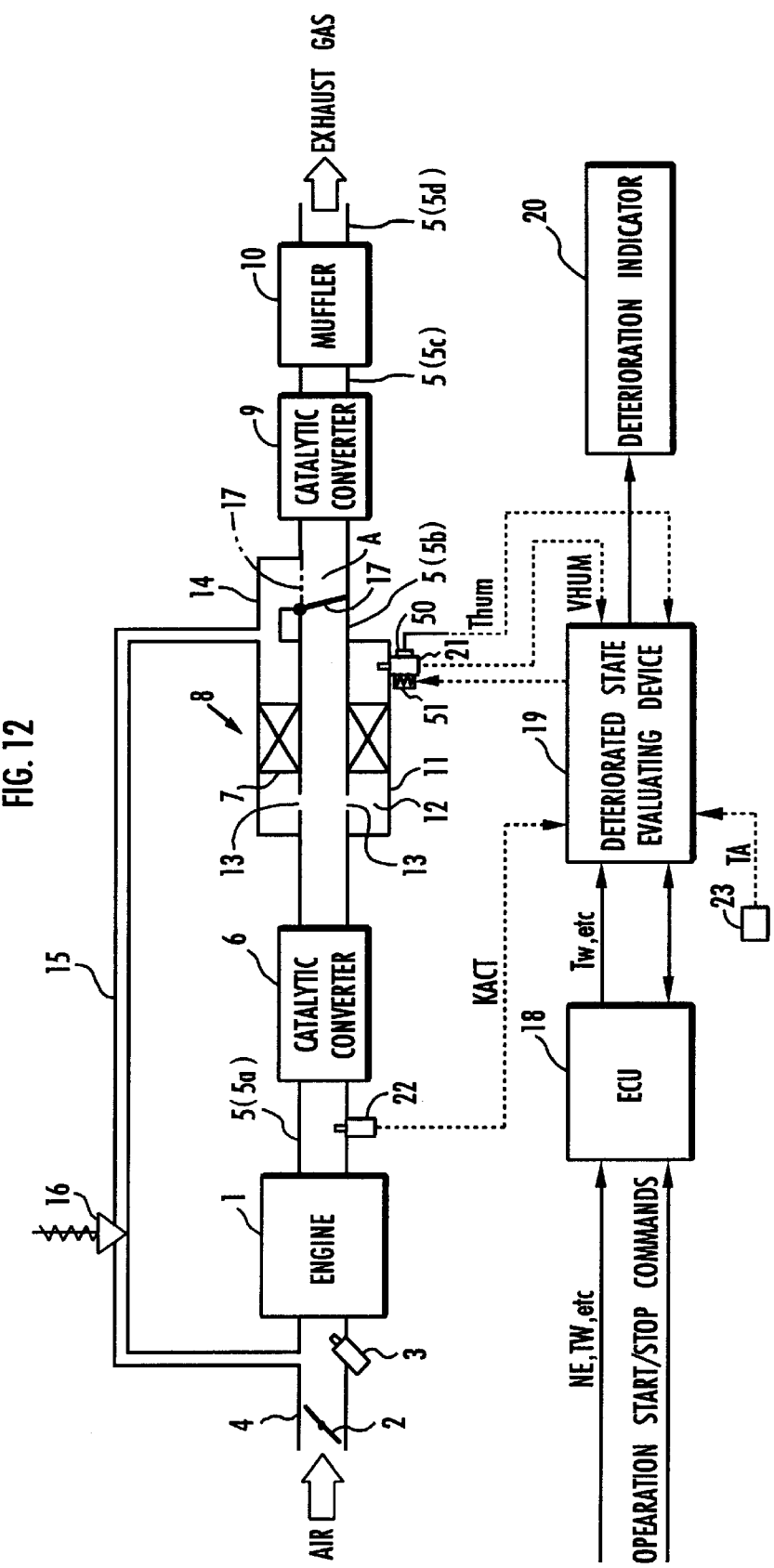
FIG. 12 is a block diagram of a system arrangement of an apparatus to which a method of evaluating a deteriorated state of a hydrocarbon adsorbent according to a fourth embodiment of the present invention is applied.

As shown in FIG. 12, the humidity sensor 21 is associated with a temperature sensor 50 for detecting the temperature Thum (hereinafter referred to as "sensor temperature Thum") and a heater 51 for heating the humidity sensor 21. The sensor temperature Thum detected by the temperature sensor 50 represents the temperature of a humidity-sensitive element of the humidity sensor 21, i.e., a sensor body sensitive to the humidity. The heater 51 heats the humidity-sensitive element of the humidity sensor 21. An output signal from the temperature sensor 50, i.e., a detected signal representing the detected value of the sensor temperature Thum, is transmitted to the deteriorated state evaluating device 19. The heater 51 comprises an electric heater which is energized by the deteriorated state evaluating device 19. In FIG. 12, the temperature sensor 50 and the heater 51 are shown as being mounted on outer surfaces of the humidity sensor 21. Actually, however, the temperature sensor 50 and the heater 51 are placed in the casing of the humidity sensor 21. In the present embodiment, the heater 51 serves to clean the humidity sensor 21 to remove dust from the humidity-sensitive element of the humidity sensor 21, but is not directly used to evaluate the deteriorated state of the HC adsorbent 7. Therefore, the heater 51 may not necessarily be required, but may be dispensed with. In fifth and sixth embodiments to be described later on, the heater 51 is used to evaluate the deteriorated state of the HC adsorbent 7. Other structural details of the apparatus shown in FIG. 12 are identical to those of the apparatus shown in FIG. 1.

The process carried out by the ECU 18 and the deteriorated state evaluating device 19 in the method according to the fourth embodiment while the internal combustion engine 1 is in operation is the same as the process in the method according to the first embodiment. While the internal combustion engine 1 is being shut off, the deteriorated state evaluating device 19 is activated at a suitable time by an off timer as with the first embodiment, and executes a process (deterioration evaluating process) shown in FIG. 13.

The deteriorated state evaluating device 19 judges the values of the flags F/HCPG and F/MCND in STEP71, STEP72 as in STEP11, STEP12 shown in FIG. 3 according to the first embodiment. If F/HCPG=0 or F/MCND=0, then the deteriorated state evaluating device 19 carries out the same process as with the first embodiment. If F/HCPG=1 and F/MCND=1, then the deteriorated state evaluating device 19 acquires present detected value data of the engine temperature TW from the ECU 18 and detected value data of the atmospheric temperature TA (the temperature outside of the exhaust system including the exhaust gas purifier 8, etc.) based on the present output signal from the humidity sensor 21 in STEP73.

Then, the deteriorated state evaluating device 19 determines whether the difference (TW−TA) between the present engine temperature TW and the atmospheric temperature TA is smaller than the predetermined value DT or not in STEP74. The decision process in STEP74 is the same as the decision process in STEP14 shown in FIG. 3. If the answer to the decision process in STEP74 is "NO", then the deteriorated state evaluating device 19 carries out the same process as with the first embodiment.

If the answer to the decision process in STEP74 is "YES" (the engine temperature TW is substantially equal to the atmospheric temperature TA), then the deteriorated state evaluating device 19 acquires detected value data of the sensor temperature Thum based on the output signal from the temperature sensor 50 in STEP75. The deteriorated state evaluating device 19 then determines whether or not the acquired sensor temperature Thum is equal to or higher than a predetermined lower limit sensor temperature TL in STEP76. The lower limit sensor temperature TL corresponds to a first given temperature according to the present invention. If the sensor temperature Thum is in a temperature range lower than the lower limit sensor temperature TL, the correlation between the output signal (output volt-age, represented by VVH) of the humidity sensor 21 and the relative humidity sensor VHUM tends to suffer variations. In the present embodiment, the lower limit sensor temperature TL is 10° C., for example.

Figure 13:
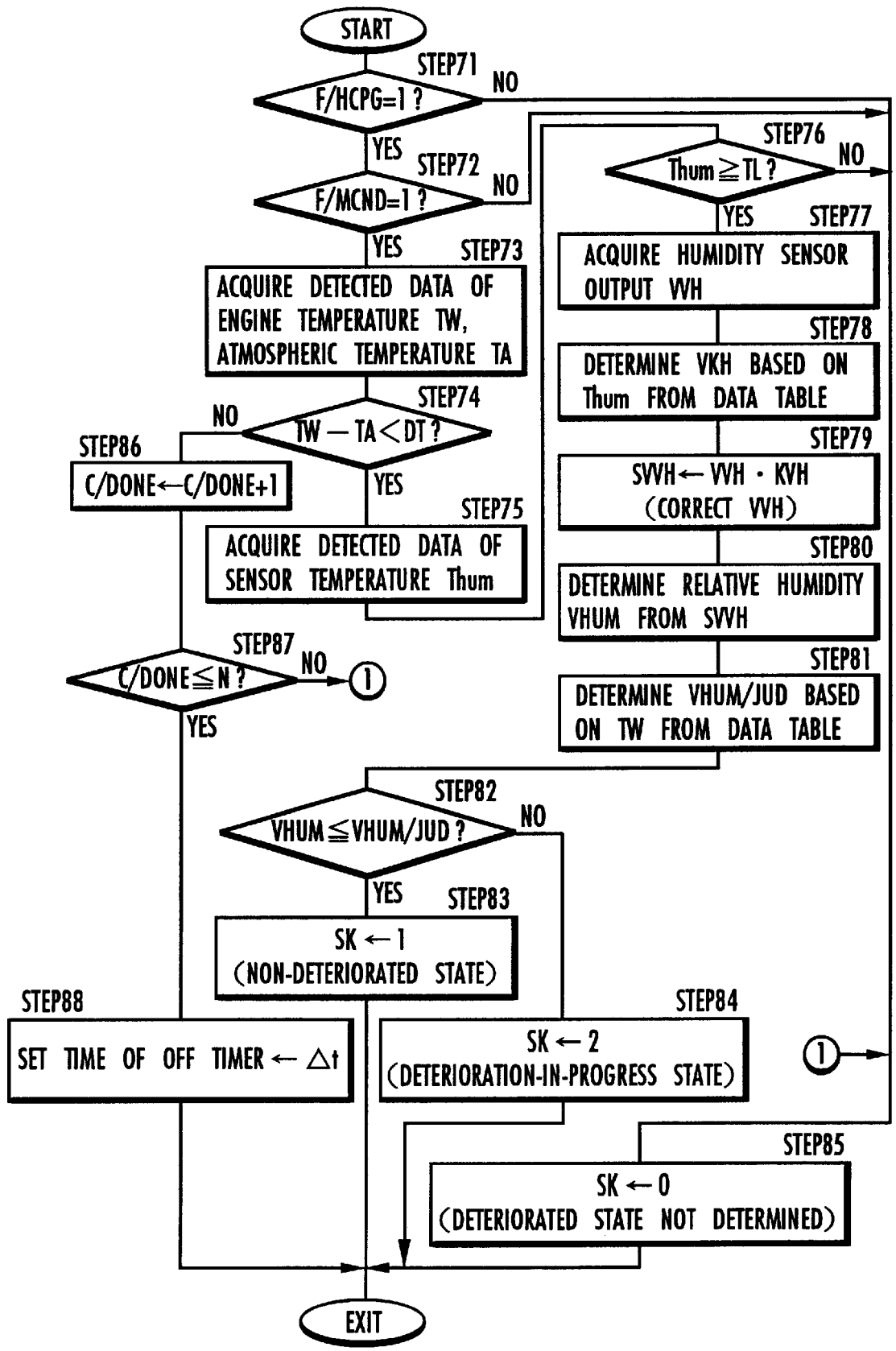
FIG. 13 is a flowchart of an operation sequence of the apparatus shown in FIG. 12.

If the answer to the decision process in STEP76 is "NO" (Thum<TL), then since the correlation between the relative humidity VHUM detected by the humidity sensor 21 and the output signal VVH of the humidity sensor 21 tends to suffer variations, the correlation between the relative humidity VHUM represented by the output signal VVH of the humidity sensor 21 and the deteriorated state of the HC adsorbent 7 also tends to suffer variations. The deteriorated state evaluating device 19 then sets the evaluation result parameter SK to "0", making the evaluation of the deteriorated state of the HC adsorbent 7 undetermined, in STEP 85. The deterioration evaluating process shown in FIG. 13 is not put to an end.

Figure 14:
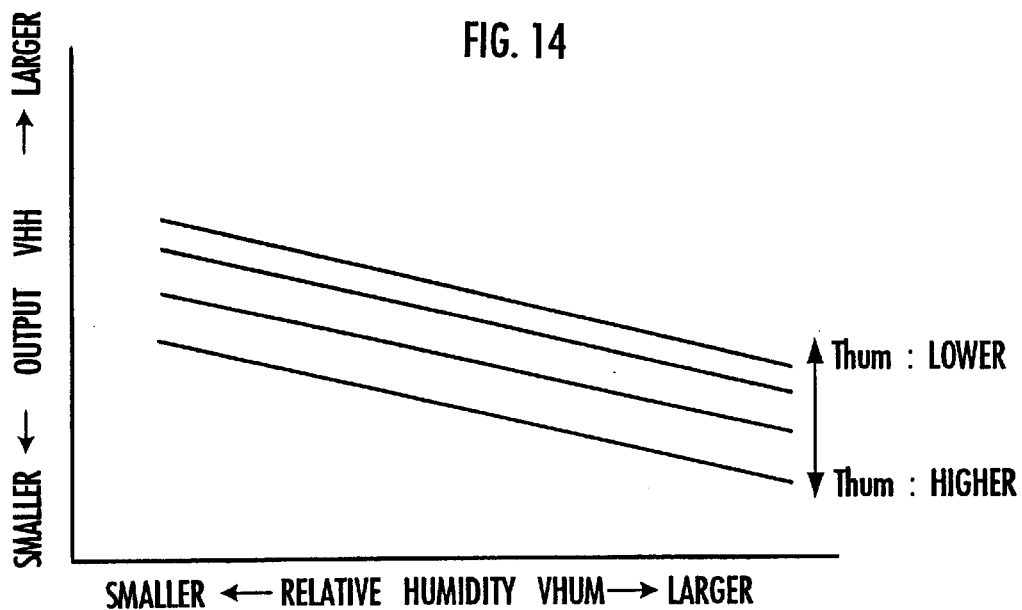
FIG. 14 is a diagram showing the output characteristics of a temperature sensor in the apparatus shown in FIG. 12.

If the answer to the decision process in STEP76 is "YES" (Thum≧TL), then the deteriorated state evaluating device 19 acquires the present output signal VVH from the humidity sensor 21 in STEP77. The relationship between the output signal VVH from the humidity sensor 21 and the relative humidity VHUM will be described below. As shown in FIG. 14, the humidity sensor 21 according to the fourth embodiment has negative output characteristics such that as the relative humidity VHUM increases, the level of the output signal VVH decreases. The negative output characteristics of the humidity sensor 21 are affected by the temperature state of the humidity-sensitive element of the humidity sensor 21 in that the level of the output signal VVH increases as the temperature of the humidity-sensitive element of the humidity sensor 21 rises. The output characteristics of the humidity sensor 21 are generally known.

Figure 15:
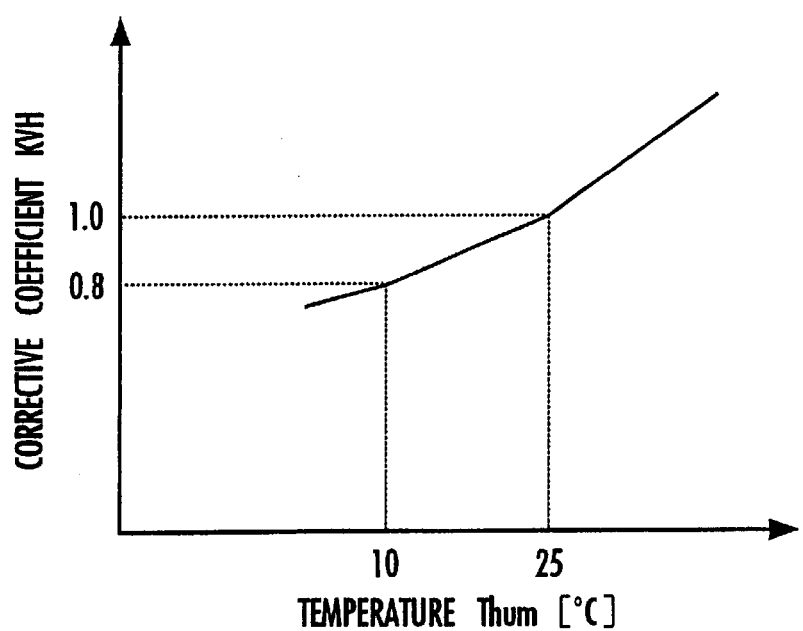
FIG. 15 is a diagram showing a data table used in the operation sequence shown in FIG. 13.

The deteriorated state evaluating device 19 determines a corrective coefficient KVH for correcting the output signal VVH of the humidity sensor 21 based on the detected value of the sensor temperature Thum acquired in STEP75 from a data table shown in FIG. 15 in STEP78. The corrective coefficient KVH corrects the output signal VVH acquired in STEP77 by multiplying the output signal VVH in order to determine an output signal from the humidity sensor 21 at the time the sensor temperature Thum is a predetermined reference temperature (e.g., 25° C.). In the data table shown in FIG. 15, the corrective coefficient KVH has a value of "1" when the sensor temperature Thum is the predetermined reference temperature (25° C.). Since the output signal VVH of the humidity sensor 21 is higher as the sensor temperature Thum is lower, the data table shown in FIG. 15 is established such that the value of the corrective coefficient KVH is higher as the temperature Thum is higher. The reference temperature for use as a reference for the corrective coefficient KVH may be determined in a temperature range (higher than at least the lower limit sensor temperature TTL, preferably a temperature range from 25 to 30° C.) to obtain good output characteristics of the humidity sensor 21 (output characteristics in which the correlation between the output signal VVH and the relative humidity VHUM is high).

Then, the deteriorated state evaluating device 19 multiplies the output signal VVH acquired in STEP77 by the corrective coefficient KVH thereby to correct the output signal VVH into an output signal SVVH (hereinafter referred to as "reference temperature output signal SVVH") at the time the sensor temperature Thum is the predetermined reference temperature (25° C.) in STEP79. Thus, the output signal VVH of the humidity sensor 21 acquired in STEP77 is corrected depending on the present temperature state of the humidity sensor 21. The deteriorated state evaluating device 19 determines a relative humidity VHUM from the reference temperature output signal SVVH in STEP80. Specifically, the deteriorated state evaluating device 19 determines a relative humidity VHUM from the reference temperature output signal SVVH based on the output characteristics of the humidity sensor 21 (which are stored as a data table or a formula) at the time the sensor temperature Thum is the predetermined reference temperature (25° C.).

After having determined the relative humidity VHUM, the deteriorated state evaluating device 19 carries out the same process as in STEP15 through STEP18 shown in FIG. 3 in STEP81 through STEP84 thereby to determine whether the HC adsorbent 7 is in the non-deteriorated state or the deterioration-in-progress state, i.e., to essentially evaluate the deteriorated state of the HC adsorbent 7, and sets the evaluation result parameter SK to "1" or "2". Other processing details are identical to those of the first embodiment.

In the fourth embodiment, the output signal VVH of the humidity sensor 21 is corrected into the reference temperature output signal SVVH depending on the temperature state of the humidity sensor 21, and the relative humidity VHUM is recognized from the reference temperature output signal SVVH. The recognized relative humidity VHUM is then compared with the threshold VHUM/JUD to essentially evaluate the deteriorated state of the HC adsorbent 7, i.e., to determine whether the HC adsorbent 7 is in the non-deteriorated state or the deterioration-in-progress state. The deteriorated state of the HC adsorbent 7 is not essentially evaluated when the sensor temperature Thum is lower than the lower limit sensor temperature TL. Therefore, the deteriorated state of the HC adsorbent 7 can appropriately be evaluated without being affected by the temperature state of the humidity sensor 21, and the evaluation result is highly reliable. These advantages are the same as those of the first embodiment.

Figure 16:
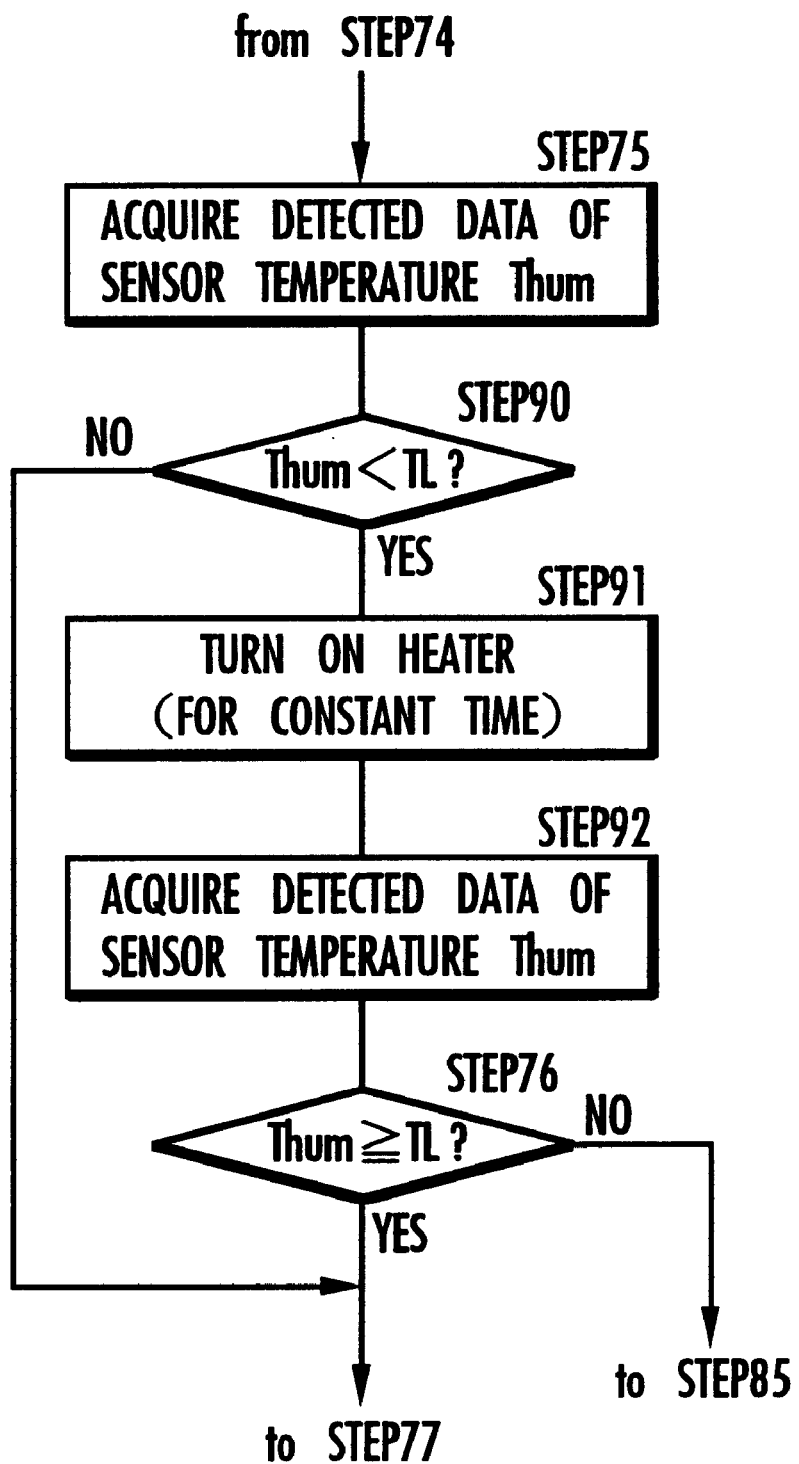
FIG. 16 is a flowchart of an operation sequence of an apparatus to which a method of evaluating a deteriorated state of a hydrocarbon adsorbent according to a fifth embodiment of the present invention is applied.

A method of evaluating a deteriorated state of a hydrocarbon adsorbent according to a fifth embodiment of the present invention will be described below with reference to FIG. 16. The method according to the fifth embodiment differs from the method according to the fourth embodiment only with respect to a portion of the process carried out by the deteriorated state evaluating device 19. only the different process portion will be described below, and those parts and functions according to the fifth embodiment which are identical to those according to the fourth embodiment are denoted by identical figures and reference characters, and will not be described below. In the fifth embodiment, the heater 51 of the humidity sensor 21 shown in FIG. 12 is used in the process of evaluating the deteriorated state of the HC adsorbent 7, and is energized by the deteriorated state evaluating device 19.

The method according to the fifth embodiment differs from the method according to the fourth embodiment only with respect to a portion of the deterioration evaluating process shown in FIG. 13. FIG. 16 shows that different portion of the deterioration evaluating process. Specifically, in the fifth embodiment, the deteriorated state evaluating device 19 carries out the operation sequence shown in FIG. 16 between STEP75 and STEP76 of the deterioration evaluating process shown in FIG. 13. The operation sequence shown in FIG. 16 will be described below. After having acquired the detected value data of the sensor temperature Thum from the output signal of the temperature sensor 50 in STEP75, the deteriorated state evaluating device 19 determines whether the sensor temperature Thum is lower than the lower limit sensor temperature TL (10° C. in the present embodiment) or not in STEP90. If Thum<TL, then the deteriorated state evaluating device 19 energizes (turns on) the heater 51 (see FIG. 12) to heat the humidity-sensitive element of the humidity sensor 21 in STEP91. In the present embodiment, the deteriorated state evaluating device 19 continuously energizes the heater 51 for a certain period of time (e.g., 20 seconds). The period of time for which the heater 51 is continuously energized is basically preset to a period of time in which the sensor temperature Thum rises to a temperature equal to or higher than the lower limit temperature sensor TL due to the energization of the heater 51, i.e., the heating of the humidity sensor 21. This period of time, i.e., a period of time in which the humidity sensor 21 is heated by the heater 51, may be variable depending on the sensor temperature Thum, i.e., the temperature state of the humidity sensor 21, and may for example be longer as the sensor temperature Thum is lower.

After having heated the humidity sensor 21 with the heater 51 in STEP91, the deteriorated state evaluating device 19 executes the process from STEP76 shown in FIG. 13. If Thum≧TL in STEP90, then the deteriorated state evaluating device 19 executes the process from STEP77 shown in FIG. 13. Other processing details are exactly the same as those according to the fourth embodiment. When the humidity sensor 21 is heated by the heater 51 in STEP91, the situation Thum<TL in STEP76 does not basically occur except when the heater 51 fails to operate or the ambient temperature is extremely low.

In the fifth embodiment, if the sensor temperature Thum is lower than the lower limit sensor temperature Tl, i.e., the correlation between the output signal VVH of the humidity sensor 21 and the relative humidity VHUM tends to vary, the humidity-sensitive element of the humidity sensor 21 is heated by the heater 51 to increase the sensor temperature Thum to a temperature equal to or higher than the lower limit sensor temperature TL. Thereafter, the deteriorated state evaluating device 19 carries out the process from STEP77 shown in FIG. 13 to correct the output signal VVH of the humidity sensor 21 and essentially evaluate the deteriorated state of the HC adsorbent 7. Therefore, even in a low-temperature environment in which the sensor temperature Thum is too low for the humidity sensor 21 to produce an appropriate output signal VVH in the deterioration evaluating process (at the time the deteriorated state evaluating device 19 is activated while the internal combustion engine 1 is being shut off), the deteriorated state of the HC adsorbent 7 can essentially be evaluated after the temperature of the humidity sensor 21 is increased. Consequently, the deteriorated state evaluating device 19 has a better chance to produce a highly reliable evaluation result independent of the temperature state of the humidity sensor 21 after the internal combustion engine 1 is shut off.

In the fourth and fifth embodiments, the output signal VVH of the humidity sensor 21 is corrected by the corrective coefficient KVH established depending on the sensor temperature Thum. However, the output signal VVH of the humidity sensor 21 may not be corrected, but the threshold VHUM/JUD for determining the deteriorated state of the HC adsorbent 7 may be corrected depending on the temperature state of the humidity sensor 21 to compensate for changes in the output characteristics of the humidity sensor 21 depending on its temperature state.

Figure 17:
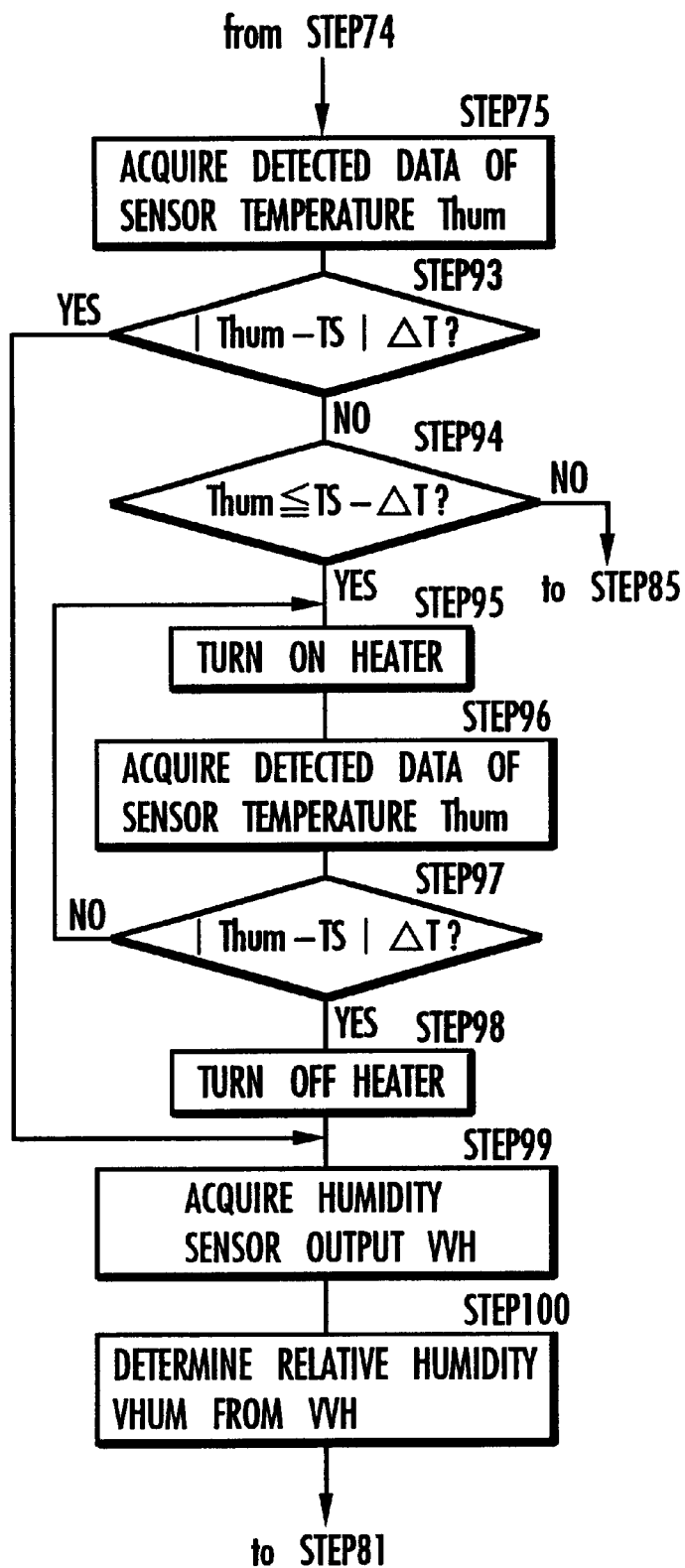
FIG. 17 is a flowchart of an operation sequence of an apparatus to which a method of evaluating a deteriorated state of a hydrocarbon adsorbent according to a sixth embodiment of the present invention is applied.

A method of evaluating a deteriorated state of a hydrocarbon adsorbent according to a sixth embodiment of the present invention will be described below with reference to FIG. 17. The method according to the sixth embodiment differs from the method according to the fourth embodiment only with respect to a portion of the process carried out by the deteriorated state evaluating device 19. Only the different process portion will be described below, and those parts and functions according to the fifth embodiment which are identical to those according to the fourth embodiment are denoted by identical figures and reference characters, and will not be described below. In the six embodiment, the heater 51 of the humidity sensor 21 shown in FIG. 12 is used in the process of evaluating the deteriorated state of the HC adsorbent 7, as with the fifth embodiment.

The method according to the sixth embodiment differs from the method according to the fourth embodiment only with respect to a portion of the deterioration evaluating process shown in FIG. 13. FIG. 17 shows that different portion of the deterioration evaluating process. Specifically, in the sixth embodiment, the deteriorated state evaluating device 19 carries out the operation sequence shown in FIG. 16 instead of STEP76 through STEP80 of the deterioration evaluating process shown in FIG. 13. The operation sequence shown in FIG. 17 will be described below. After having acquired the detected value data of the sensor temperature Thum from the output signal of the temperature sensor 50 in STEP75, the deteriorated state evaluating device 19 determines whether the sensor temperature Thum is in a range close to a predetermined reference temperature TS, i.e., in a range of TS−ΔT<Thum<TS+ΔT, or not in STEP93. The reference temperature TS corresponds to a second given temperature according to the present invention, and is 25° C., for example. The temperature ΔT which defines the above range is of a sufficiently small positive value, and is 2 degrees, for example.

If the answer to STEP93 is "YES", then the deteriorated state evaluating device 19 acquires the output signal VVH of the humidity sensor 21 in STEP99, and determines a relative humidity VHUM from the acquired output voltage VVH in STEP100. Specifically, the deteriorated state evaluating device 19 determines a relative humidity VHUM based on the output characteristics of the humidity sensor 21 (which are stored as a data table or a formula) at the time the sensor temperature Thum is the reference temperature TS (25° C.). Thereafter, the deteriorated state evaluating device 19 carries out the process from STEP81 shown in FIG. 13 to essentially evaluate the deteriorated state of the HC adsorbent 7.

If the answer to STEP93 is "NO", then the deteriorated state evaluating device 19 determines whether or not the detected value of the sensor temperature Thum acquired in STEP75 is equal to or lower than a lower limit (=TS−ΔT) of the above range in STEP94. If the answer to STEP94 is "NO", then the deteriorated state evaluating device 19 carries out the process in STEP85 shown in FIG. 13, after which the deterioration evaluating process is ended. Specifically, the deteriorated state evaluating device 19 makes the deteriorated state of the HC adsorbent 7 undetermined, and sets the evaluation result parameter SK to "0". When the answer to STEP94 is "NO", the sensor temperature Thum is equal to or higher than an upper limit (=TS+ΔT) of the above range.

If the answer to STEP94 is "YES", the deteriorated state evaluating device 19 energizes (turns on) the heater 51 to heat the humidity-sensitive element of the humidity sensor 21 in STEP95. The deteriorated state evaluating device 19 energizes the heater 51 according to a feedback control process (e.g., a PI control process) to converge the sensor temperature Thum to the reference temperature TS. Alternatively, the deteriorated state evaluating device 19 may energize the heater 51 with an amount of electric energy which is set depending on the detected value of the sensor temperature Thum acquired in STEP75. While energizing the heater 51, the deteriorated state evaluating device 19 acquires the detected value data of the sensor temperature Thum from the output signal of the temperature sensor 51 in STEP96. The deteriorated state evaluating device 19 then determines whether the sensor temperature Thum is in the range of TS−ΔT<Thum<TS+ΔT close to the predetermined reference temperature TS or not in STEP97. If the sensor temperature Thum is not in that range, then the deteriorated state evaluating device 19 repeats the process from STEP95 to continuously energize the heater 51.

If the sensor temperature Thum reaches a temperature in the range of TS−ΔT<Thum<TS+ΔT due to the energization of the heater 51 (the heating of the humidity sensor 21), i.e., if the answer to STEP97 is "YES", then the deteriorated state evaluating device 19 deenergizes the heater 51 to turn off the heater 51 in STEP98, and carries out the process from STEP99. Other processing details are identical to those of the fourth embodiment.

In the sixth embodiment, the output signal VVH of the humidity sensor 21 is acquired and the deteriorated state of the HC adsorbent 7 is essentially evaluated to determine whether the HC adsorbent 7 is in the non-deteriorated state or the deterioration-in-progress state only when the sensor temperature Thum detected at the time the deteriorated state evaluating device 19 is activated while the internal combustion engine 1 is being shut off is a temperature within the range close to the reference temperature TS. When the sensor temperature is lower than the lower limit of the above range, the heater 51 heats the humidity sensor 21. After the sensor temperature Thum reaches a temperature within the range close to the reference temperature TS, the deteriorated state evaluating device 19 acquires the output signal VVH of the humidity sensor 21 and essentially evaluate the deteriorated state of the HC adsorbent 7. Therefore, the effect of changes in the output characteristics of the humidity sensor 21 depending on its temperature state can be ignored. Stated otherwise, the deteriorated state of the HC adsorbent 7 can appropriately be evaluated with high reliability using the output signal VVH of the humidity sensor 21 which is adequate for essentially evaluating the deteriorated state of the HC adsorbent 7 without the need for correcting the output signal VVH of the humidity sensor 21 depending on the sensor temperature Thum.

When the sensor temperature is lower than the range close to the reference temperature TS, the heater 51 heats the humidity sensor 21 to raise the sensor temperature Thum to the range close to the reference temperature TS. The reference temperature TS for the sensor temperature Thum is set to a relatively high temperature in a temperature range in which the output characteristics of the humidity sensor 21 become adequate. Consequently, the deteriorated state evaluating device 19 has a better chance to essentially evaluate the deteriorated state of the HC adsorbent 7.

In the fourth through sixth embodiments, the output signal VVH of the humidity sensor 21 or the reference output signal SVVH produced by correcting the output signal VVH with the corrective coefficient KVH is converted into the relative humidity VHUM, and then the relative humidity VHUM is compared with the threshold VHUM/JUD to essentially evaluate the deteriorated state of the HC adsorbent 7. However, the output signal VVH of the humidity sensor 21 or the reference output signal SVVH may be compared with a threshold corresponding to the relative humidity VHUM (a threshold with respect to the output value of the humidity sensor 21 corresponding to the relative humidity VHUM, represented by VVH/JUD) to evaluate the deteriorated state of the HC adsorbent 7. Specifically, the reference output signal SVVH determined in STEP79 in FIG. 13 may be compared with the threshold VVH/JUD which is established depending on the temperature state of the HC adsorbent 7, e.g., the engine temperature TW representing the temperature state of the HC adsorbent 7, to evaluate the deteriorated state of the HC adsorbent 7. In the sixth embodiment, the output signal VVH acquired in STEP99 shown in FIG. 17 may be compared with the threshold VVH/JUD established as described above to evaluate the deteriorated state of the HC adsorbent 7. At any rate, if the output characteristics of the humidity sensor 21 with respect to the relative humidity VHUM are negative output characteristics as described above, then the threshold VVH/JUD is established such that it has a larger value as the temperature state of the HC adsorbent 7 at the time (or a time close thereto) of acquiring the output signal VVH of the humidity sensor 21 for use in evaluating the deteriorated state of the HC adsorbent 7 is lower, unlike the threshold VHUM/JUD relative to the relative humidity VHUM. When the output signal VVH or the reference output signal SVVH is equal to or higher than the threshold VVH/JUD, the HC adsorbent 7 is determined as being in the non-deteriorated state, and when the output signal VVH or the reference output signal SVVH is smaller than the threshold VVH/JUD, the HC adsorbent 7 is determined as being in the deterioration-in-progress state.

In the fourth through sixth embodiments, the deteriorated state of the HC adsorbent 7 is evaluated while the internal combustion engine 1 is being shut off. However, if the deteriorated state of the HC adsorbent 7 is evaluated when the internal combustion engine 1 starts to operate as with the second embodiment, the deterioration evaluating process taking into account the temperature state of the humidity sensor 21 may be carried out as with the fourth through sixth embodiments. Specifically, when the internal combustion engine 1 starts to operate (before cranking to start the internal combustion engine 1), if the answer to STEP35 shown in FIG. 6 is "YES", the process from STEP75 shown in FIGS. 13, 16, 17 according to the fourth through sixth embodiments may be carried out. Other processing details may be identical to those of the second embodiment. However, if the heater 51 is energized to heat the humidity sensor 21 before the internal combustion engine 1 starts to operate, then the start of operation of the internal combustion engine 1 is delayed. Therefore, it is preferable to evaluate the deteriorated state of the HC adsorbent 7 without energizing the heater 51 as with the fourth embodiment (FIG. 13).

In the fourth through sixth embodiments, after the internal combustion engine 1 is shut off, the deteriorated state of the HC adsorbent 7 is evaluated while the relative humidity VHUM near the HC adsorbent 7 is substantially constant (in the steady humidity period Δtpx shown in FIG. 4). However, when the deteriorated state of the HC adsorbent 7 is to be evaluated at the time when the relative humidity VHUM takes a maximum value, as with the third embodiment, the deterioration evaluating process taking into account the temperature state of the humidity sensor 21 may be carried out as with the fourth through sixth embodiments. In this case, the output signal from the humidity sensor 21 at the time the internal combustion engine 1 is shut off is corrected depending on the sensor temperature Thum (the temperature state of the humidity sensor 21), and the corrected output signal or the relative humidity recognized from the corrected output signal is stored as a reference value. The above correction may be carried out using the corrective coefficient KVH described above in the fourth embodiment. Then, upon elapse of a certain period of time (TMR shown in FIG. 4) after the internal combustion engine 1 is shut off, the output signal from the humidity sensor 21 is acquired, and then corrected depending on the sensor temperature Thum (the temperature state of the humidity sensor 21) at the time the output signal from the humidity sensor 21 is acquired. A change in the corrected output signal or the relative humidity recognized from the corrected output signal, from the reference value at the time the internal combustion engine 1 is shut off, is compared with a threshold established depending on the temperature state of the HC adsorbent 7 (the temperature state upon elapse of the given time TMR after the internal combustion engine 1 is shut off) for thereby evaluating the deteriorated state of the HC adsorbent 7.

In the fourth through sixth embodiments, the sensor temperature Thum is directly detected by the temperature sensor 50 to recognize the temperature state of the humidity sensor 21. However, the sensor temperature Thum may be estimated from a suitable parameter such as the engine temperature TW or the like. Alternatively, if the relative humidity close to the HC adsorbent 7 is substantially constant, then since the temperature state of the humidity sensor 21 is considered to be substantially equal to the engine temperature TW and the atmospheric temperature TA, the detected value of the engine temperature TW or the atmospheric temperature TA may be used as a substitute representing the temperature state of the humidity sensor 21.

In the first through sixth embodiments, the directional control valve 17 may be actuated into the imaginary-line position in FIG. 1 or FIG. 12 while the internal combustion engine 1 is in operation. With the directional control valve 17 in the imaginary-line position, the space around the humidity sensor 21 is highly sealed to make stabler the relative humidity VHUM in the space around the humidity sensor 21, i.e., to make more reliable the relative humidity VHUM as depending on the deteriorated state of the HC adsorbent 7. As a result, the deteriorated state of the HC adsorbent 7 can be evaluated more stably and accurately.

In the first through sixth embodiments, the present invention has been described with respect to the system returns the HC released from the HC adsorbent 7 during the operation of the internal combustion engine 1 to the intake pipe of the internal combustion engine 1, and combusts the returned HC in the internal combustion engine 1. However, the present invention is also applicable to a system in which the HC released from the HC adsorbent 7 is returned to an area upstream of the catalytic converter 6 which is positioned upstream of the HC adsorbent 7 to cause the catalytic converter 6 to purify the returned HC, or a system in which the HC released from the HC adsorbent 7 is returned to the catalytic converter 9 which is positioned downstream of the HC adsorbent 7 to cause the catalytic converter 9 to purify the returned HC.

A method of evaluating a deteriorated state of a hydrocarbon adsorbent according to a seventh embodiment of the present invention is applied will be described below with reference to FIG. 18. An apparatus to which the method according to the seventh embodiment differs from the apparatus according to the first through third embodiments or the fourth through sixth embodiments only with respect to a portion of the exhaust system of the internal combustion engine. Those parts and functions according to the seventh embodiment which are identical to those according to the first through sixth embodiments are denoted by identical figures and reference characters, and will not be described below.

Figure 18:
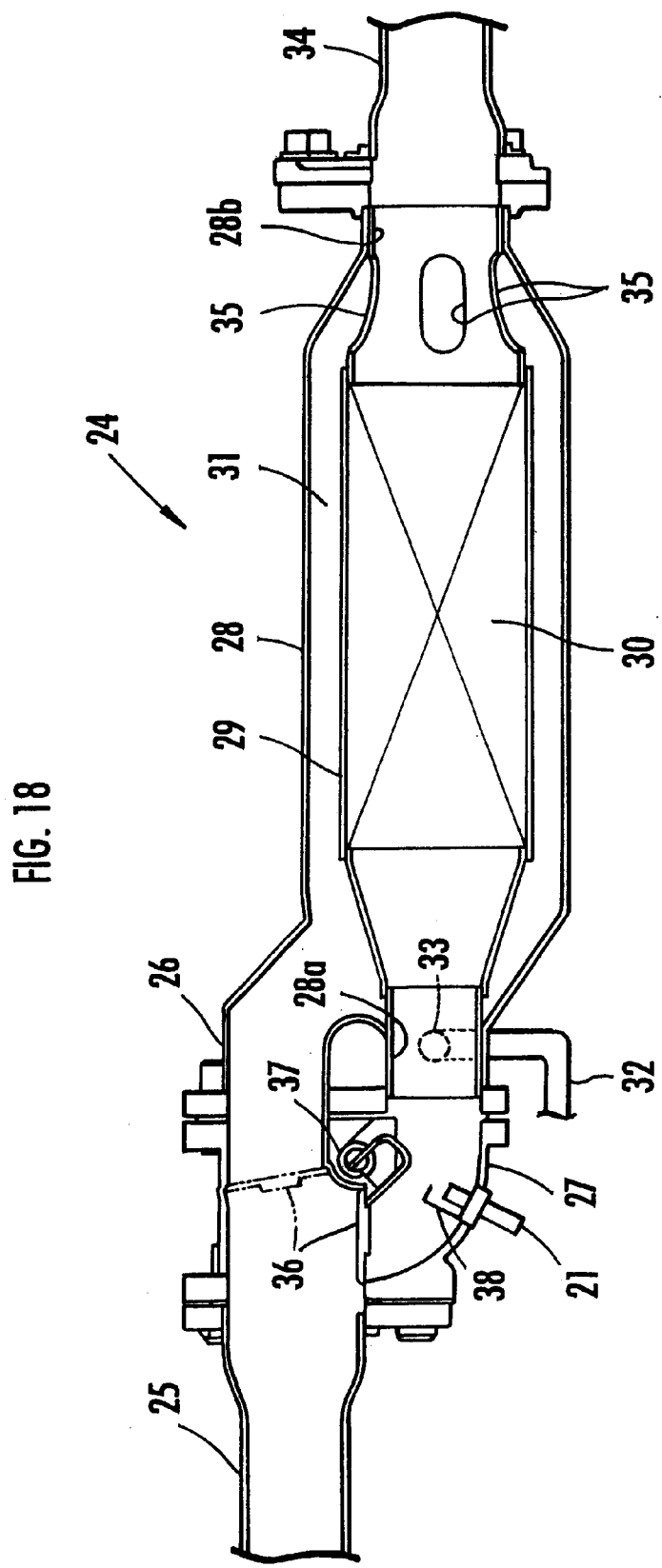
FIG. 18 is a cross-sectional view of an exhaust gas purifier in an apparatus to which a method of evaluating a deteriorated state of a hydrocarbon adsorbent according to a seventh embodiment of the present invention is applied.

In the seventh embodiment, the exhaust gas purifier 8 according to the first through sixth embodiments is replaced with an exhaust gas purifier 24 shown in FIG. 18. As shown in FIG. 18, the exhaust gas purifier 24 has an exhaust pipe 25 extending downstream of the catalytic converter 6 shown in FIG. 1 or FIG. 12, two divided flow passages 26, 27 branched from a downstream end of the exhaust pipe 25, a substantially cylindrical housing 28 communicating with a downstream portion of the divided flow passage 26, and a bypass exhaust pipe 29 (exhaust passage) housed concentrically in the housing 28. The bypass exhaust pipe 29 is filled with a cylindrical HC adsorbent 30, which is of the same material as the HC adsorbent according to the first through third embodiments. A space 31 defined between the inner circumferential surface of the housing 28 and the outer circumferential surface of the bypass exhaust pipe 29 serves as a cylindrical exhaust passage into which the exhaust gas is introduced from the divided flow passage 26.

The bypass exhaust pipe 29 has an upstream end (left end in FIG. 18) joined to the downstream end of the divided flow passage 27 through an opening 28a defined in the upstream end of the housing 28. The upstream end of the bypass exhaust pipe 29 has an outer circumferential surface sealingly held in close contact with the inner circumferential surface of the opening 28a in the housing 28. The exhaust passage 31 in the housing 28 is not in communication with the divided flow passage 27 at the opening 28a. An EGR passage 32 (exhaust gas recirculation passage) extends from the upstream end of the bypass exhaust pipe 29. The EGR passage 32 communicates with the bypass exhaust passage 29 through a communication hole 33 defined in the circumferential wall of the upstream end of the bypass exhaust pipe 29. The EGR passage 32 is also connected to the intake pipe of the internal combustion engine 1 as with the EGR passage 15 shown in FIG. 1 or FIG. 15. The EGR passage 32 has an on/off valve (not shown) as with the EGR passage 15 shown in FIG. 1 or FIG. 15.

The bypass exhaust pipe 29 has a downstream end (right end in FIG. 18) joined to an exhaust pipe 34 connected to the upstream end of the catalytic converter 9 shown in FIG. 1 through an opening 29b defined in the downstream end of the housing 28. The catalytic converter 9 may be dispensed with, and the downstream end of the exhaust pipe 34 may be vented to the atmosphere through a muffler (silencer), for example.

The downstream end of the bypass exhaust pipe 29 has an outer circumferential surface sealingly held in close contact with the inner circumferential surface of the opening 28b in the housing 28. The exhaust passage 31 in the housing 28 is not in communication with the exhaust pipe 34 at the opening 28b. The downstream end of the bypass exhaust pipe 29 has a plurality of communication holes 35 defined in its circumferential wall and communicating with the exhaust passage 31 in the housing 28. The exhaust passage 31 communicates with the bypass exhaust pipe 29 through the communication holes 35.

A directional control valve 36 is disposed in a region where the exhaust pipe 25 is branched into the divided flow passages 26, 27 for selectively connecting the divided flow passages 26, 27 to the exhaust pipe 25. The directional control valve 36 is angularly movable about a pivot shaft selectively into a solid-line position and an imaginary-line position by an actuator (not shown). When the directional control valve 36 is in the solid-line position, it disconnects the divided flow passage 27 from the exhaust pipe 25 and connects the divided flow passage 26 to the exhaust pipe 25. When the directional control valve 36 is in the solid-line position, therefore, the exhaust gas emitted from the internal combustion engine 1 flows through the exhaust pipe 25, the divided flow passage 26, the exhaust passage 31 in the housing 28, the communication holes 35, and the exhaust pipe 34 into the catalytic converter 9 (atmospheric side) shown in FIG. 1 or FIG. 12. When the directional control valve 36 is in the imaginary-line position, it disconnects the divided flow passage 26 from the exhaust pipe 25 and connects the divided flow passage 27 to the exhaust pipe 25. When the directional control valve 36 is in the imaginary-line position, therefore, the exhaust gas emitted from the internal combustion engine 1 flows through the exhaust pipe 25, the divided flow passage 27, the bypass exhaust pipe 29 (including the HC adsorbent 30 disposed therein), and the exhaust pipe 34 into the catalytic converter 9 (atmospheric side) shown in FIG. 1 or FIG. 12.

In the seventh embodiment, the humidity sensor 21 is positioned between the directional control valve 36 and the HC adsorbent 30 in the bypass exhaust pipe 29, or more specifically, is mounted in the divided flow passage 27 near the HC adsorbent 30 and projects into the divided flow passage. The humidity sensor 21 is combined with a guard member 38 for preventing the exhaust gas from directly hitting the humidity-sensitive element of the humidity sensor 21 which is positioned in the divided flow passage 27. Other structural details are identical to those according to the first through third embodiments or the fourth through sixth embodiments.

According to the seventh embodiment, the directional control valve 36 is controlled by an actuator (not shown) such as an electric motor or the like under the control of the ECU 18 when the internal combustion engine 1 is in operation, as with the directional control valve 17 according to the first through sixth embodiments. More specifically, immediately after the internal combustion engine 1 starts to operate, the directional control valve 36 is basically placed in the imaginary-line position shown in FIG. 18. Therefore, the exhaust gas from the internal combustion engine 1 is supplied to the HC adsorbent 30 in the bypass exhaust pipe 29, which adsorbs HC contained in the exhaust gas. When the catalytic converters 6, 9 (see FIG. 1) disposed respectively upstream and downstream of the exhaust gas purifier 24 are heated and activated by the exhaust gas, the directional control valve 36 is shifted to the solid-line position shown in FIG. 18. Consequently, the exhaust gas from the internal combustion engine 1 is normally discharged into the atmosphere through the exhaust passage 31 in the housing 28. After the HC adsorbent 30 is heated by the exhaust gas, the HC released from the HC adsorbent 30 are returned through the EGR passage 32 to the intake pipe of the internal combustion engine 1, which combusts the returned HC.

In the seventh embodiment, the deteriorated state evaluating device 19 operates in exactly the same manner as the deteriorated state evaluating device 19 according to any one of the first through sixth embodiments. That is, the deteriorated state of the HC adsorbent 30 is evaluated using the output signal of the humidity sensor 21 (the detected value of the relative humidity VHUM) after the internal combustion engine 1 is shut off. In the seventh embodiment, the space around the humidity sensor 21, i.e., the space within the divided flow passage 27, is held in communication with the atmosphere through the HC adsorbent 7 and the catalytic converter 9. Therefore, after the internal combustion engine 1 is shut off, any gas exchange between the space around the humidity sensor 21, i.e., the space near the HC adsorbent 30, and the exterior (the atmosphere) is difficult to progress. Thus, the deteriorated state of the HC adsorbent 7 can be evaluated reliably stably.

In the seventh embodiment, the directional control valve 36 may be actuated into the solid-line position shown in FIG. 18 while the internal combustion engine 1 is being shut off. When the directional control valve 36 is thus positioned, the space around the humidity sensor 21 is highly sealed, allowing the deteriorated state of the HC adsorbent 7 to be evaluated stably accurately.

A method of evaluating a deteriorated state of a hydrocarbon adsorbent according to an eighth embodiment of the present invention will be described below with reference to FIG. 19. The apparatus to which the method according to the eighth embodiment is applied differs from the apparatus to which the method according to the first through third embodiments or the fourth through sixth embodiments is applied only with respect to the arrangement of the exhaust system of the internal combustion engine and the layout of the humidity sensor. Those parts and functions according to the eighth embodiment which are identical to those according to the first through sixth embodiments are denoted by identical figures and reference characters, and will not be described below.

Figure 19:
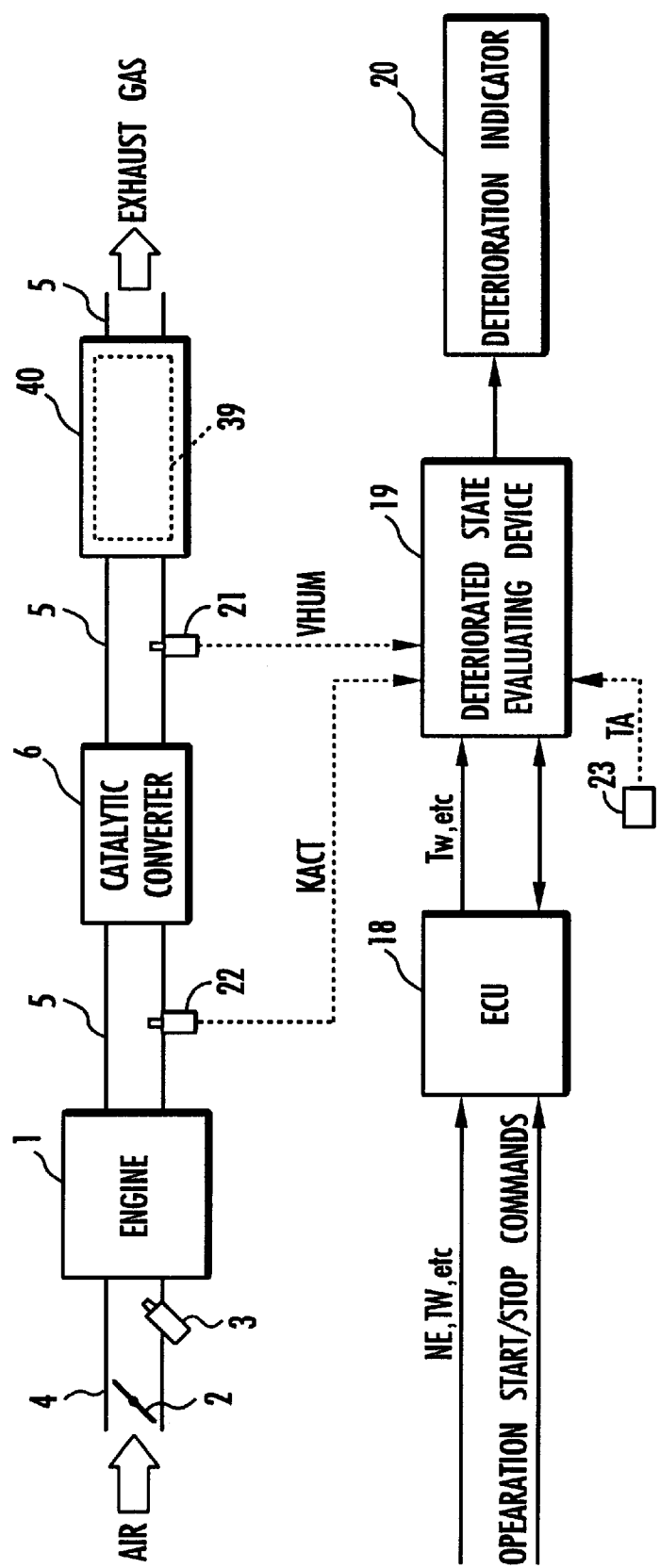
FIG. 19 is a block diagram of a system arrangement of an apparatus to which a method of evaluating a deteriorated state of a hydrocarbon adsorbent according to an eighth embodiment of the present invention is applied.

As shown in FIG. 19, an exhaust gas purifier 40 containing a hydrocarbon adsorption catalyst 39 is disposed on the exhaust pipe 5 of the internal combustion engine 1 downstream of the catalytic converter 6. A structure downstream of the exhaust gas purifier 40 may be identical to the structure downstream of the exhaust gas purifier 8 shown in FIG. 1 or FIG. 12. The exhaust gas purifier 40 may have its downstream end vented to the atmosphere through only a muffler, for example.

The hydrocarbon adsorption catalyst 39 comprises a composite combination of an HC adsorbent and a catalyst such as a three-way catalyst. More specifically, the hydrocarbon adsorption catalyst 39 comprises a honeycomb structure whose surface is coated with zeolite as an HC adsorbent and supports thereon a layer of precious metal such as platinum, palladium, rhodium, etc. as a constituent element of a three-way catalyst. According to the eighth embodiment, a deteriorated state of the HC adsorbent contained in the hydrocarbon adsorption catalyst 39 is evaluated. To evaluate the deteriorated state of the HC adsorbent, the humidity sensor 21 is mounted on the exhaust pipe 5 (exhaust passage) between the catalytic converter 6 and the exhaust gas purifier 40 upstream of the exhaust gas purifier 40. Other structural details are identical to those according to the first through third embodiments or the fourth through sixth embodiments.

In the eighth embodiment, the deteriorated state evaluating device 19 carries out its deterioration evaluating process in exactly the same manner as the deteriorated state evaluating device 19 according to any one of the first through sixth embodiments for thereby evaluating the deteriorated state of the HC adsorbent of the hydrocarbon adsorption catalyst 39. Since air from the atmosphere finds it difficult to enter the space around the humidity sensor 21, as with the first through sixth embodiments, the deteriorated state evaluating device 19 according to the eighth embodiment can evaluate the deteriorated state of the HC adsorbent stably accurately.

A method of evaluating a deteriorated state of a hydrocarbon adsorbent according to a ninth embodiment of the present invention will be described below with reference to FIG. 20. The apparatus to which the method according to the ninth embodiment is applied differs from the apparatus to which the method according to the first through third embodiments or the fourth through sixth embodiments is applied only with respect to the arrangement of the exhaust system of the internal combustion engine and the layout of the humidity sensor. Those parts and functions according to the ninth embodiment which are identical to those according to the first through sixth embodiments are denoted by identical figures and reference characters, and will not be described below.

Figure 20:
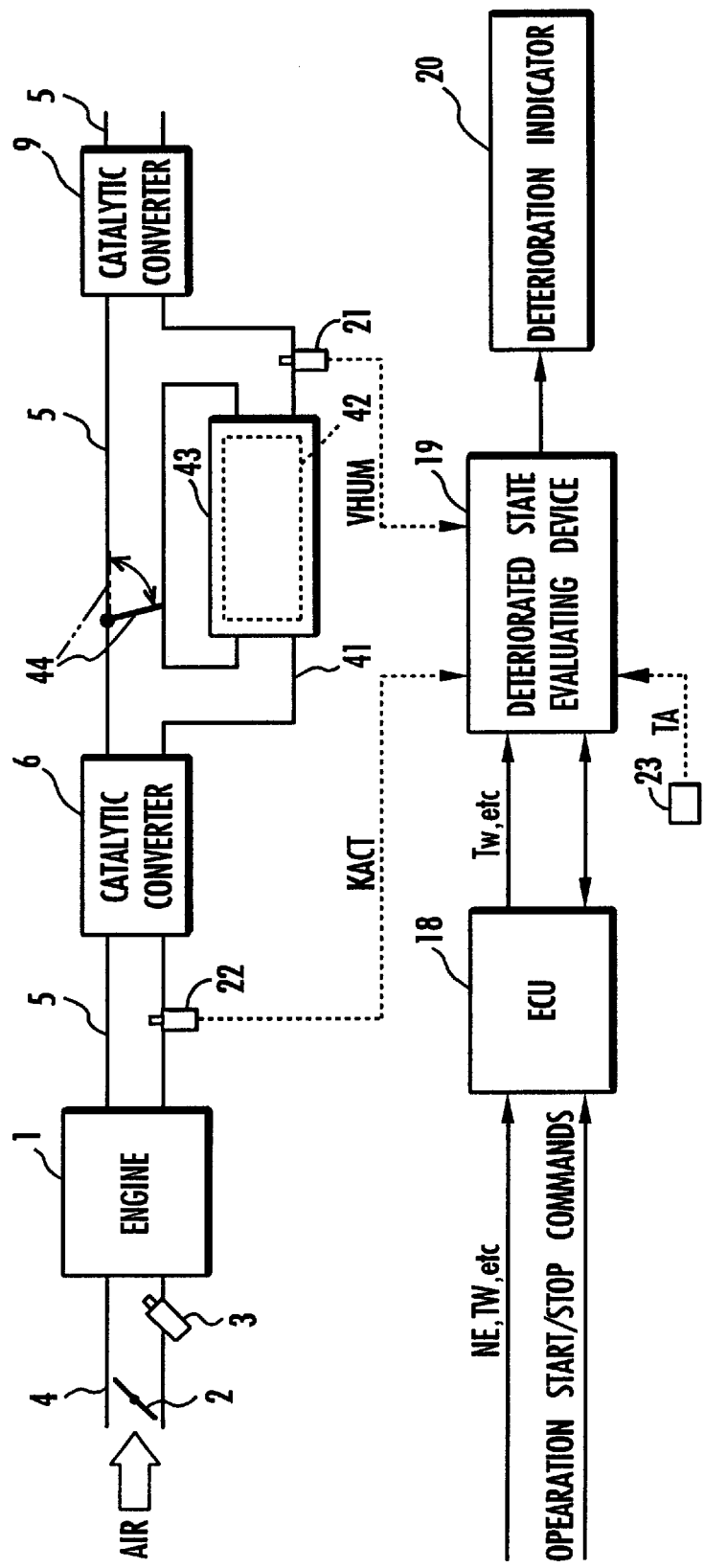
FIG. 20 is a block diagram of a system arrangement of an apparatus to which a method of evaluating a deteriorated state of a hydrocarbon adsorbent according to a ninth embodiment of the present invention is applied.

As shown in FIG. 20, a bypass exhaust pipe 41 is branched from a portion of the exhaust pipe 5 downstream of the catalytic converter 6, and an exhaust gas purifier 43 containing an HC adsorbent 42 is disposed on the bypass exhaust pipe 41. The HC adsorbent 42 is of the same material as the HC adsorbent according to the first through seventh embodiments. A portion of the bypass exhaust pipe 41 downstream of the exhaust gas purifier 43 is joined to the exhaust pipe 5, and the catalytic converter 9 is disposed downstream of the junction between the bypass exhaust pipe 41 and the exhaust pipe 5. The catalytic converter 9 has its downstream end vented to the atmosphere through a muffler, for example, as with the embodiment shown in FIG. 1.

A directional control valve 44 is disposed in the exhaust pipe 5 downstream of the region thereof where the bypass exhaust pipe 41 is branched. The directional control valve 44 selectively opens and closes the exhaust pipe 5 in the region where the directional control valve 44 is located, and is actuated by an actuator such as an electric motor or the like under the control of the ECU 18. The humidity sensor 21 which is used in evaluating the deteriorated state of the HC adsorbent 42 is disposed in and projects into the bypass exhaust passage 41 downstream of the exhaust gas purifier 43 near the HC adsorbent 42. Other structural details are identical to those according to the first through third embodiments or the fourth through sixth embodiments.

In the ninth embodiment, the directional control valve 44 is controlled by the ECU 18 while the internal combustion engine 1 is in operation, as follows: Immediately after the internal combustion engine 1 starts to operate, the directional control valve 44 is basically closed, i.e., placed in the solid-line position shown in FIG. 20. Therefore, the exhaust gas from the internal combustion engine 1 is supplied through the bypass exhaust pipe 41 to the HC adsorbent 42, which adsorbs HC contained in the exhaust gas. When the catalytic converters 6, 9 are heated and activated by the exhaust gas, the directional control valve 36 is opened, i.e., shifted to the imaginary-line position shown in FIG. 20. Consequently, the exhaust gas from the internal combustion engine 1 is normally discharged into the atmosphere through the exhaust passage 5. When the HC adsorbent 42 is heated by the exhaust gas and the adsorbed HC are released from the HC adsorbent 42, the directional control valve 44 is partly opened. Therefore, a portion of the exhaust gas from the internal combustion engine 1 flows through the exhaust passage 5, whereas the remaining exhaust gas flows through the bypass exhaust passage 41. At this time, the HC released from the HC adsorbent 42 are supplied to and purified by the catalytic converter 9.

In the ninth embodiment, the deteriorated state evaluating device 19 operates in exactly the same manner as the deteriorated state evaluating device 19 according to any one of the first through sixth embodiments. That is, the deteriorated state of the HC adsorbent 42 is evaluated using the output signal of the humidity sensor 21 (the detected value of the relative humidity VHUM) after the internal combustion engine 1 is shut off. In the ninth embodiment, the space around the humidity sensor 21, i.e., the space within the bypass exhaust pipe 41 downstream of the exhaust gas purifier 43, is held in communication with the atmosphere through the catalytic converter 9. Therefore, after the internal combustion engine 1 is shut off, since air from the atmosphere finds it difficult to enter the space around the humidity sensor 21, the deteriorated state evaluating device 19 according to the ninth embodiment can evaluate the deteriorated state of the HC adsorbent 42 stably accurately, as with the first through sixth embodiments.

Although certain preferred embodiments of the present invention have been shown and described in detail, it should be understood that various changes and modifications may be made therein without departing from the scope of the appended claims.

What is claimed is:

1. A method of evaluating a deteriorated state of a hydrocarbon adsorbent which is disposed in an exhaust passage of an internal combustion engine for adsorbing hydrocarbons in an exhaust gas emitted from the internal combustion engine, comprising the steps of:

after the internal combustion engine is shut off, evaluating the deteriorated state of said hydrocarbon adsorbent based on an output signal from a humidity sensor which is disposed in the exhaust passage close to said hydrocarbon adsorbent for detecting a humidity in said exhaust passage, within a period of time before the humidity represented by the output signal from said humidity sensor is converged to a humidity outside of said exhaust passage.

2. A method according to claim 1, wherein said output signal from said humidity sensor to be used for evaluating the deteriorated state of said hydrocarbon adsorbent comprises an output signal acquired therefrom within a predetermined steady period in which the output signal from the humidity sensor is kept substantially constant.

3. A method according to claim 2, wherein said steady period comprises a period after elapse of a predetermined time at least after the internal combustion engine is shut off.

4. A method according to claim 2, wherein said steady period comprises a period after at least a temperature state close to said hydrocarbon adsorbent is substantially equal to a temperature state outside of said exhaust passage.

5. A method according to claim 2, wherein said steady period terminates when a predetermined time elapses after the internal combustion engine is shut off.

6. A method according to claim 2, wherein said step of evaluating the deteriorated state of said hydrocarbon adsorbent comprises the step of comparing either the output signal of said humidity sensor acquired within said steady period or a humidity represented by said output signal with a threshold established depending on the temperature state of said hydrocarbon adsorbent when the output signal of said humidity sensor is acquired.

7. A method according to claim 1, wherein said output signal from said humidity sensor comprises an output signal acquired therefrom upon elapsing of a predetermined time after the internal combustion engine is shut off.

8. A method according to claim 7, wherein said predetermined time is determined to be close to a time required until the humidity represented by the output signal from said humidity sensor takes a maximum value.

9. A method according to claim 7, wherein said predetermined time is established depending on the temperature state of said hydrocarbon adsorbent at least when the internal combustion engine is shut off.

10. A method according to claim 9, wherein said predetermined time is established depending on the temperature state of said hydrocarbon adsorbent when the internal combustion engine is shut off and a temperature state outside of said exhaust passage.

11. A method according to claim 7, wherein said step of evaluating the deteriorated state of said hydrocarbon adsorbent comprises the step of comparing either the output signal of said humidity sensor acquired upon elapse of said predetermined time or a humidity represented by said output signal with a threshold established depending on the temperature state of said hydrocarbon adsorbent upon elapse of said predetermined time.

12. A method according to claim 7, wherein said step of evaluating the deteriorated state of said hydrocarbon adsorbent comprises the steps of storing an output signal acquired from said humidity sensor when the internal combustion engine is shut off as a reference output signal, and comparing either a change from said reference output signal of the output signal acquired from said humidity sensor upon elapse of said predetermined time or a change in a humidity represented by said change in the output signal with a threshold established depending on the temperature state of said hydrocarbon adsorbent upon elapse of said predetermined time.

13. A method according to claim 1, wherein said step of evaluating the deteriorated state of said hydrocarbon adsorbent comprises the step of evaluating the deteriorated state of said hydrocarbon adsorbent based on an acquired value of the output signal from said humidity sensor and the temperature state of said humidity sensor at the time the output signal from said humidity sensor is acquired, in order to compensate for the effect of a change in the output signal from said humidity sensor depending on the temperature state of said humidity sensor.

14. A method according to claim 2, wherein said step of evaluating the deteriorated state of said hydrocarbon adsorbent comprises the steps of correcting the output signal acquired from said humidity sensor within said steady period depending on the temperature state of said humidity sensor at the time the output signal from said humidity sensor is acquired, and thereafter comparing either the corrected output signal of said humidity sensor or a humidity represented by the corrected output signal with a threshold established depending on the temperature state of said hydrocarbon adsorbent at the time the output signal from said humidity sensor is acquired.

15. A method according to claim 13 or 14, further comprising the steps of recognizing the temperature state of said humidity sensor before the output signal from said humidity sensor to be used for evaluating the deteriorated state of said hydrocarbon adsorbent is acquired, and, if the recognized temperature state is lower than a first predetermined temperature, heating said humidity sensor with a heater to increase the temperature state of said humidity sensor to a temperature state equal to or higher than said first predetermined temperature.

16. A method according to claim 1 or 2, wherein said output signal from said humidity sensor to be used for evaluating the deteriorated state of said hydrocarbon adsorbent comprises an output signal acquired therefrom when the temperature state of said humidity sensor is a temperature state in a range close to a second predetermined temperature.

17. A method according to claim 16, further comprising the steps of recognizing the temperature state of said humidity sensor before the output signal from said humidity sensor to be used for evaluating the deteriorated state of said hydrocarbon adsorbent is acquired, and, if the recognized temperature state is lower than the temperature in said range close to said second predetermined temperature, heating said humidity sensor with a heater to increase the temperature of said humidity sensor to the temperature in said range close to said second predetermined temperature.

18. A method according to any one of claims 1, 2, or 7, wherein said step of evaluating the deteriorated state of said hydrocarbon adsorbent based on the output signal from said humidity sensor is carried out after said internal combustion engine is shut off at least under predetermined operating conditions.

19. A method according to claim 18, wherein said predetermined operating conditions include a condition relative to an air-fuel ratio before said internal combustion engine is shut off, such that said step of evaluating the deteriorated state of said hydrocarbon adsorbent based on the output signal from said humidity sensor is carried out if the air-fuel ratio at least immediately before said internal combustion engine is shut off is kept at an air-fuel ratio close to a stoichiometric air-fuel ratio continuously for a predetermined period of time.

20. A method according to claim 18, wherein said predetermined operating conditions include a condition relative to a warmed-up state before said internal combustion engine is shut off, such that said step of evaluating the deteriorated state of said hydrocarbon adsorbent based on the output signal from said humidity sensor is carried out if an engine temperature at least immediately before said internal combustion engine is shut off is equal to or higher than a predetermined temperature.

21. A method according to any one of claims 1, 2, or 7, wherein said exhaust passage is arranged to hold a space around said humidity sensor in communication with the atmosphere at least through said hydrocarbon adsorbent or a catalytic converter.

* * * * *